United States Patent
Kahle et al.

(10) Patent No.: US 8,145,542 B2
(45) Date of Patent: Mar. 27, 2012

(54) SERVICE FOR ENABLING USERS TO SHARE INFORMATION REGARDING PRODUCTS REPRESENTED ON WEB PAGES

(75) Inventors: Brewster P. Kahle, San Francisco, CA (US); Niall P. O'Driscoll, San Francisco, CA (US); Ronna C. Tanenbaum, San Francisco, CA (US); Jeffrey M. Bartolotta, San Francisco, CA (US); Sondra L. Cholach, San Francisco, CA (US); Paul Van Der Merve Sauer, San Francisco, CA (US)

(73) Assignee: Alexa Internet, San Francisco, CA (US)

( * ) Notice: Subject to any disclaimer, the term of this patent is extended or adjusted under 35 U.S.C. 154(b) by 1034 days.

(21) Appl. No.: 12/048,044

(22) Filed: Mar. 13, 2008

(65) Prior Publication Data
US 2008/0162231 A1    Jul. 3, 2008

Related U.S. Application Data

(62) Division of application No. 09/820,207, filed on Mar. 28, 2001, now Pat. No. 7,373,313.

(51) Int. Cl.
 *G06Q 30/00* (2006.01)
(52) U.S. Cl. .................. 705/26.7; 705/26.1; 705/26.61; 705/26.64
(58) Field of Classification Search ......... 705/26.1–27.2
See application file for complete search history.

(56) References Cited

U.S. PATENT DOCUMENTS

| | | |
|---|---|---|
| 5,727,129 A | 3/1998 | Barrett et al. |
| 6,081,829 A | 6/2000 | Sidana |
| 6,282,548 B1 | 8/2001 | Burner et al. |
| 6,381,597 B1 | 4/2002 | Lin |
| 6,405,175 B1 | 6/2002 | Ng |
| 6,484,156 B1 | 11/2002 | Gupta et al. |
| 6,556,975 B1 | 4/2003 | Wittsche |
| 6,571,295 B1 | 5/2003 | Sidana |
| 6,687,734 B1 | 2/2004 | Sellink et al. |
| 6,721,802 B1 | 4/2004 | Wright et al. |
| 6,877,137 B1 | 4/2005 | Rivette et al. |
| 6,889,250 B2 | 5/2005 | Bezos et al. |
| 7,072,856 B1 | 7/2006 | Nachom |

(Continued)

FOREIGN PATENT DOCUMENTS

WO   WO 00/62223 A1   10/2000

OTHER PUBLICATIONS

M. Roscheisen, C. Mogensen and T. Winograd, "*Beyond browsing: shared comments, SOAPs, trails, and on-line communities*," Computer Networks and ISDN Systems 27, Proceedings of the Third International World-Wide Web Conference, pp. 739-749, dated Apr. 10-14, 1995.

(Continued)

*Primary Examiner* — Michael Misiaszek
(74) *Attorney, Agent, or Firm* — Knobbe, Martens, Olson & Bear LLP

(57) ABSTRACT

A system is disclosed that enables users to share product-related information across web pages. The system includes a client that executes on a user computer. The client interacts with a data server to provide user access to product-related information associated with products represented on web pages accessed by the user. The product-related information may include information submitted by other users via other instances of the client.

29 Claims, 29 Drawing Sheets

SERVER PROCESS FOR PROVIDING DATA

U.S. PATENT DOCUMENTS

| | | |
|---|---|---|
| 7,085,736 B2 | 8/2006 | Keezer et al. |
| 2005/0171861 A1 | 8/2005 | Bezos et al. |

OTHER PUBLICATIONS

M. Rocheisen, C. Mogensen and T. Winograd, "*Shared Web Annotations As a Platform for Third-Party Value-Added Information Providers: Architecture, Protocols, and Usage Examples*," Technical Report CSDTR/DLTR, ComMentor, pp. 1-32, printed on Dec. 20, 1999.

D. Plotnikoff, "*Navigation tools help the Web traveler*," San Jose Mercury News Mercury Center, pp. 1-3, dated Feb. 5, 2000.

1 page internet printout of New Flyswat 2.0, Answers faster, Simpler, and everywhere, printed on Feb. 14, 2000.

1 page internet printout of flyswat—The smart way to Buzz through the Web, printed on Dec. 20, 1999.

2 page internet printout of GuruNet—Your Instant Expert, printed on Feb. 14, 2000.

Press Release, "*Third Voice Launches Tool to Democratize the Internet by Giving Every Reader a Voice on Every Web Site*," ThirdVoice.com, pp. 1-2, printed on Dec. 20, 1999.

Press Release, "*Third Voice Captures People's Voice*," Third Voice. com, pp. 1-3, printed on Dec. 20, 1999.

2 page internet printout of Clickthebutton, printed on Dec. 21, 1999.

2 page internet printout of "*Panasonic DVD-A120*," Clickthebutton, printed on Dec. 20, 1999.

Press Release, "Annotate gets rid of banners," New York Post at Annotate.net and the Press, dated Dec. 6, 1999.

3 page internet printout of "*About the Agent*," at rusure.com, printed on Dec. 20, 1999.

2 page internet printout of "*How It All Began? (The Comparative Shopping History)*," printed on Dec. 20, 1999.

Press Release, "*Internet Start-Up dash.com Receives $12.1 Million to Launch First Mobile Shopping Portal*,"dash.com, pp. 1-2, printed on Dec. 21, 1999.

M. Kane, ZDNet News, "*Internet Program lets shoppers Dash for rebates*," ZDNet.com, dated Aug. 16, 1999.

Hopper, Ian; Desktops now have power to comparison shop; CNN. com, Oct. 18, 1999.

Maney, Kevin; Auctions change the way we shop; refreq.com Nov. 17, 1999.

Make my Simon work harder for you!; mySimon.com; 1999.

Festa, Paul; Amazon pops into consumer reviews with zBubbles; cnet.com; Nov. 17, 1999.

Gillmor, Dan; Subversive Software At Your Service; San Jose Mercury News; Oct. 17, 1999.

Your Gateway to Online Shopping; RUsure.com; 2000.

O'Brien, Jim; Don't check out Without Them: Desktop shopping agents find..; Computer Shopper; Mar. 2000.

Gingerich, Jason; Keycorp Making site Into Portal; South Bend Tribune; Oct. 25, 1999.

Peet, John; Survey of E-commerce: In the great web bazaar everything has its price. The web can help; you find out what it is; Economist; Feb. 26, 2000.

Spring, Tom; Updated Flyswat Search Has Better Aim; PC World; Feb. 15, 2000.

SERVICE FOR ENABLING USERS TO SHARE INFORMATION REGARDING PRODUCTS REPRESENTED ON WEB PAGES

RELATED APPLICATIONS

This application is a division of U.S. application Ser. No. 09/820,207, filed Mar. 28, 2001, which claims the benefit of U.S. Provisional Application No. 60/199,569, filed on Apr. 25, 2000. The technical disclosures of the aforesaid applications are hereby incorporated by reference.

BACKGROUND OF THE INVENTION

1. Field of the Invention

This invention relates generally to the Internet and the World Wide Web (web) and, more particularly, to the supplementation of any web page with information related to a product represented on the page, such as where to buy the product, what other products are related to the product, and reviews of the product.

2. Description of the Related Art

Consumers are increasingly shopping on-line. Web sites, accessed through the Internet, provide a convenient forum for offering products for sale and purchasing products on-line. Oftentimes, however, a product will be represented on a web page that does not offer the product for sale. For example, the manufacturer of a product may describe or promote the product on a web page; however, if the manufacturer is not also a retailer, the web page may not offer the product for sale. It would be advantageous to enable consumers to obtain, in conjunction with a representation of a product on a web page, an on-line offer for the sale of the product, regardless of whether the web page actually offers the product for sale.

Consumers also tend to share experiences with and knowledge about a product with other consumers. It would be advantageous to enable consumers to access and share such product-related information on-line, while viewing a representation of a product on any web page.

SUMMARY

A system is disclosed that enables users to share product-related information across web pages. The system includes a client that executes on a user computer. The client interacts with a data server to provide user access to product-related information associated with products represented on web pages accessed by the user. The product-related information may include information submitted by other users via other instances of the client.

BRIEF DESCRIPTION OF THE DRAWINGS

Referring now to the drawings in which like reference numbers represent corresponding components throughout:

FIGS. 3A-M illustrate example sequences of screen captures that show several aspects of the operation of the preferred embodiment;

DETAILED DESCRIPTION OF SPECIFIC EMBODIMENTS

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent components and methods to those described herein. In other instances, well-known methods and components have not been described in detail so as not to unnecessarily obscure aspects of the present invention. The detailed description is organized in the sections as follows:

I. Overview and System Components;
II. User Interface and Functionality;
III. The Client Program;
IV. The Product Data Server;
V. Automatic Data Gathering Techniques; and
VI. Conclusion.

I. Overview and System Components

The present invention provides a system for supplementing web pages with product-related information or data. In the preferred embodiment, the system is also configured to collect product-related information from users of the system. Product-related information can include any information about a product represented or identified on a web page. Product-related information may include, for example, where and for what price the product can be purchased, what other products are related to or similar to the product, reviews of the product, and offers to sell a product. Product-related data includes product related information in electronic format, such as product related information represented in hypertext markup language (HTML) form. Additionally, product-related data can include code, script, or hypertext links that are related to a product. For example, product-related data can include a hypertext link that allows a user to purchase a product or to put the product in a virtual shopping cart. Product-related data may also include an indication that a product is represented on a particular web page.

Figure 1:
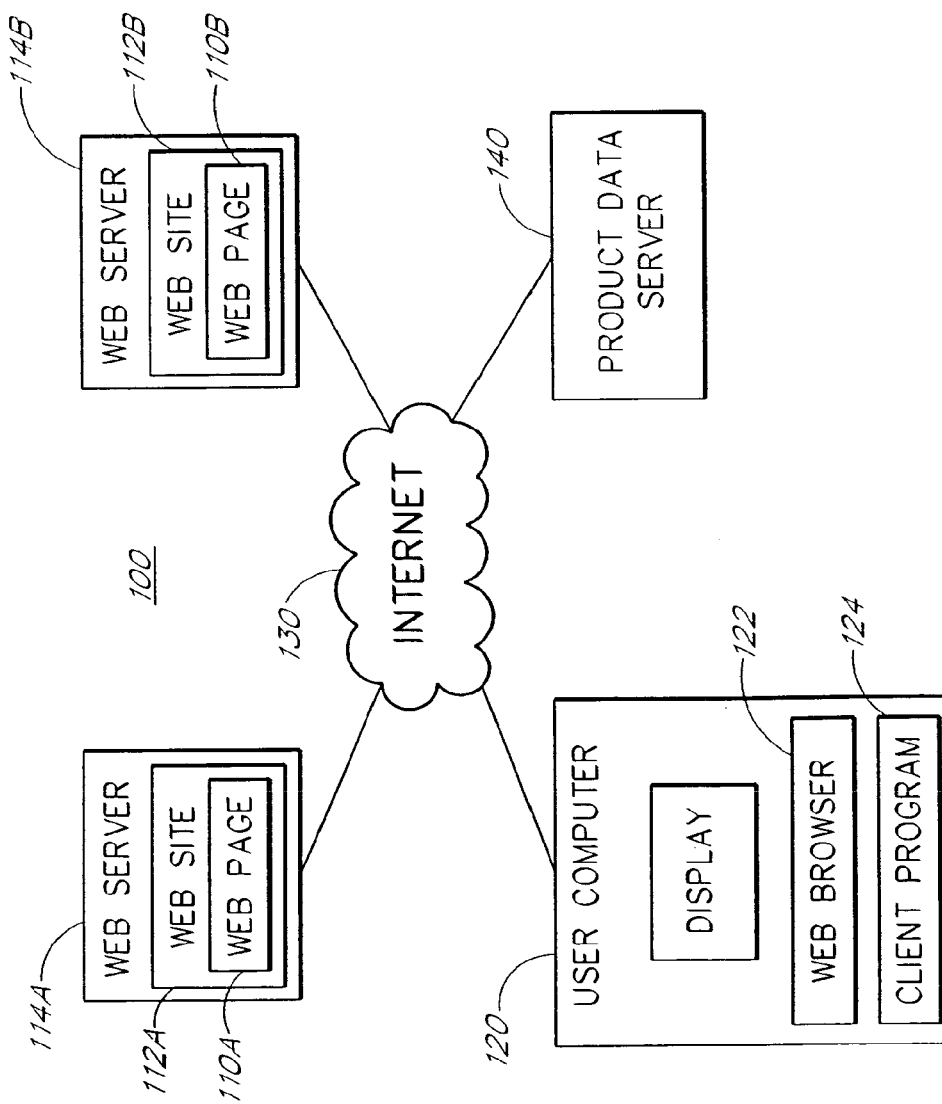
FIG. 1 illustrates the principal components of a preferred embodiment of the present invention including a web browser client program, a product data server, a plurality of web sites, and a computer network.

FIG. 1 illustrates the principal components of a preferred embodiment of the system 100. A user computer 120, a product data server 140, and multiple web servers 114A-B communicate through a computer network 130, which is preferably the Internet. The World Wide Web (web) includes numerous web sites 112A-B and web pages 110A-B, which are typically hosted by the web servers 114A-B, although only two of each are illustrated. A user (not illustrated) accesses the various web pages through a web browser 122 executing on the user computer 120. Although only a single user computer 120 is shown, many users may use the system 100, each through a separate user computer 120. The user computer 120 is typically a personal computer that is connected to the web via a computer network 130 such as the Internet. The user computer 120 may, however, be a handheld or other type of device that supports web access. Product-related information is provided to the user by a web browser client program 124 that executes in conjunction with the web browser 122 on the user computer 120. The client program 124, in turn, obtains the product-related information (data) from the product data server 140.

The product data server 140 creates and/or collects product-related data that it provides to the client program 124 in any of a number of ways that can be used alone or in combination. In the preferred embodiment, the product-related data is gathered from users themselves through the client program 124. In this case, the client program 124 is configured to allow users to identify products on web pages and to allow users to supply additional product-related information for the identified products. The client program 124 then transmits the supplied information as data to the data server 140. In one embodiment, the data server 140 can be configured to automatically search or crawl the web for product-related data using automatic data mining techniques. In one embodiment, product-related data can be manually created and/or collected and stored on the data server 140.

II. User Interface and Functionality

A. User-Selectable Display Elements and Bubbles

FIGS. 2A-D illustrate example screen captures in accordance with a preferred embodiment of the system 100. Each screen capture depicts a web browser window 200 to which the client program 124 has added various display elements.

Figure 2A:
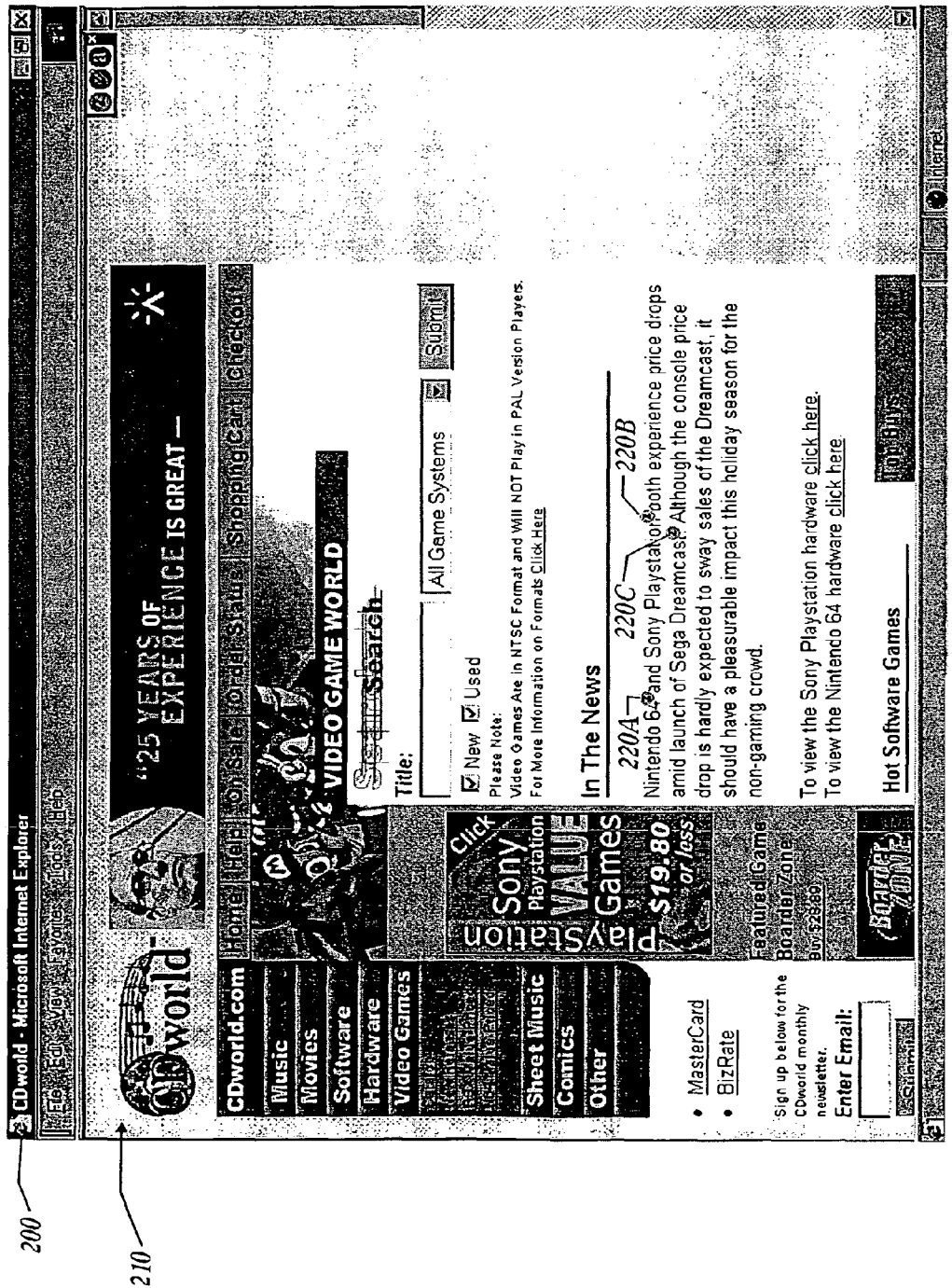
FIGS. 2A-D illustrate example screen captures in accordance with the preferred embodiment.

FIG. 2A illustrates a web page 210 to which the client program 124 has added several user-selectable display elements 220A-C (hereinafter "web page embedded product elements 220") in the paragraph below the caption "In The News." Each web page embedded product element 220A-C is positioned adjacent a representation of a product. A representation of a product is preferably the name of the product in text form, for example, "Nintendo 64," "Sony Playstation," and "Sega Dreamcast" as shown in the illustrated web page 210. A representation of a product may also or alternatively be an image of the product or a depiction of the product in an image. Each web page embedded product element 220A-C, when clicked upon, causes the client program 124 to display product-related data for the corresponding product as shown in FIG. 2B.

In one embodiment, the web page embedded product elements 220 are configured to allow a product to be purchased or added to a virtual shopping cart. Applicable technology for allowing a product to be purchased by clicking on a display element is described in U.S. Pat. No. 5,960,411 to Hartman et al., titled METHOD AND SYSTEM FOR PLACING A PURCHASE ORDER VIA A COMMUNICATIONS NETWORK. Virtual shopping carts and the technology for implementing them are well known.

Figure 2B:
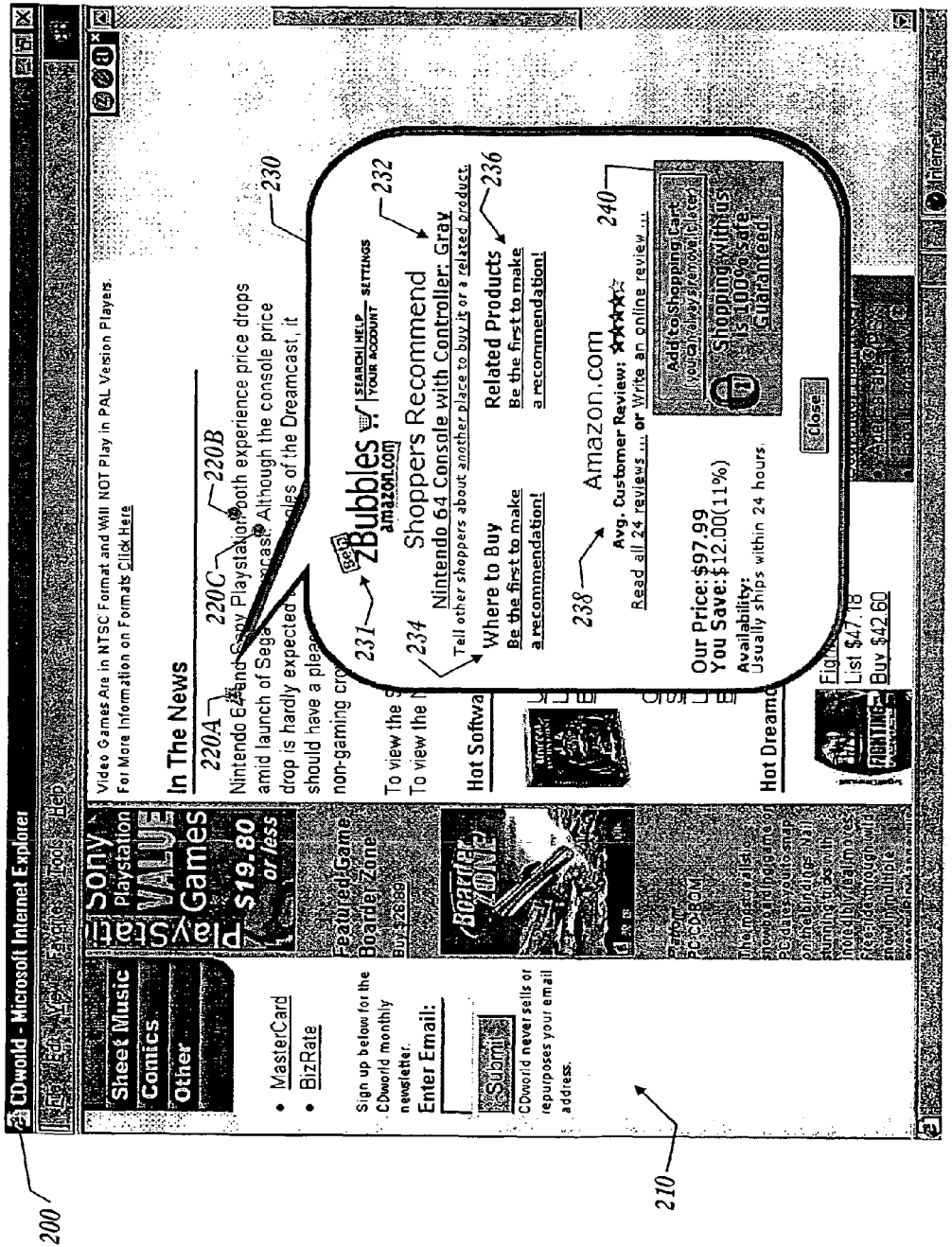

FIG. 2B illustrates a product information bubble 230 displayed by the client program 124 in response to the user's selection of the web page embedded product element 220A adjacent to the "Nintendo 64" text. The bubble 230 displays a variety of product-related data including clickable hypertext links and other selectable display elements. The illustrated bubble 230 includes a heading section 231, which lists the name of the organization that sponsors the product-related information service (Amazon.com in the illustrated bubble). The name of the organization may be in the form of a hypertext link, which, when selected, drives the browser 122 to the organization's web site or to the home page of the information service. The heading section 231 may also include other links that the sponsoring organization may wish to include.

A product title 232 preferably lists the name of the product. A "Where to Buy" section 234 preferably includes hypertext links to on-line stores where the product can be purchased. In the illustrated screen display, the data server 140 does not have any data on where to buy the product, so the user is presented with an opportunity to be the first to recommend an on-line store at which the product may be purchased. A "Related Products" section 236 preferably includes hypertext links to web pages that display alternative products to the selected product. In the illustrated screen display, the data server 140 does not have any data on related products, so the user is presented with an opportunity to be the first to recommend a related product. Later examples (see FIGS. 3F and 3I) will show the case where information is available in the "Where to Buy" 234 and "Related Products" 236 sections.

A featured store section 238, which in this case features Amazon.com, presents the user with any information that the featured store may wish to present. In this illustrated example, the featured store section 238 presents hypertext links to on-line product reviews at the featured store's web site, as well as to a page that allows the user to write an on-line review. The illustrated featured store section 238 also lists the price and availability of the product at the featured store. An "Add to Shopping Cart" button 240 allows the user to add the product to the user's virtual shopping cart at the featured store. Alternatively, a button that allows the user to purchase the product with a single action, such as a single mouse click, may be displayed.

The bubble 230 preferably also has a "Close" button 242 that allows the user to close the bubble 230. The bubble 230 is preferably configured to close automatically when the user makes a selection from the bubble 230 or when the user follows a link on the displayed web page 210. The bubble 230 can also be configured to be moveable using a click and drag action upon the outer edge of the bubble. The bubble 230 may also be configured to scroll up or down with the scrolling of the web page 210 within the web browser window 200 over which the bubble 230 may be displayed. In an alternative embodiment, the bubble 230 may be configured as a window that is displayed beside rather than over the web browser window 200.

In an alternative embodiment, the product-related information and requests for product-related information are displayed, instead of in bubbles, in a sidebar similar to the sidebar 270 illustrated in FIG. 2D below.

Figure 2C:
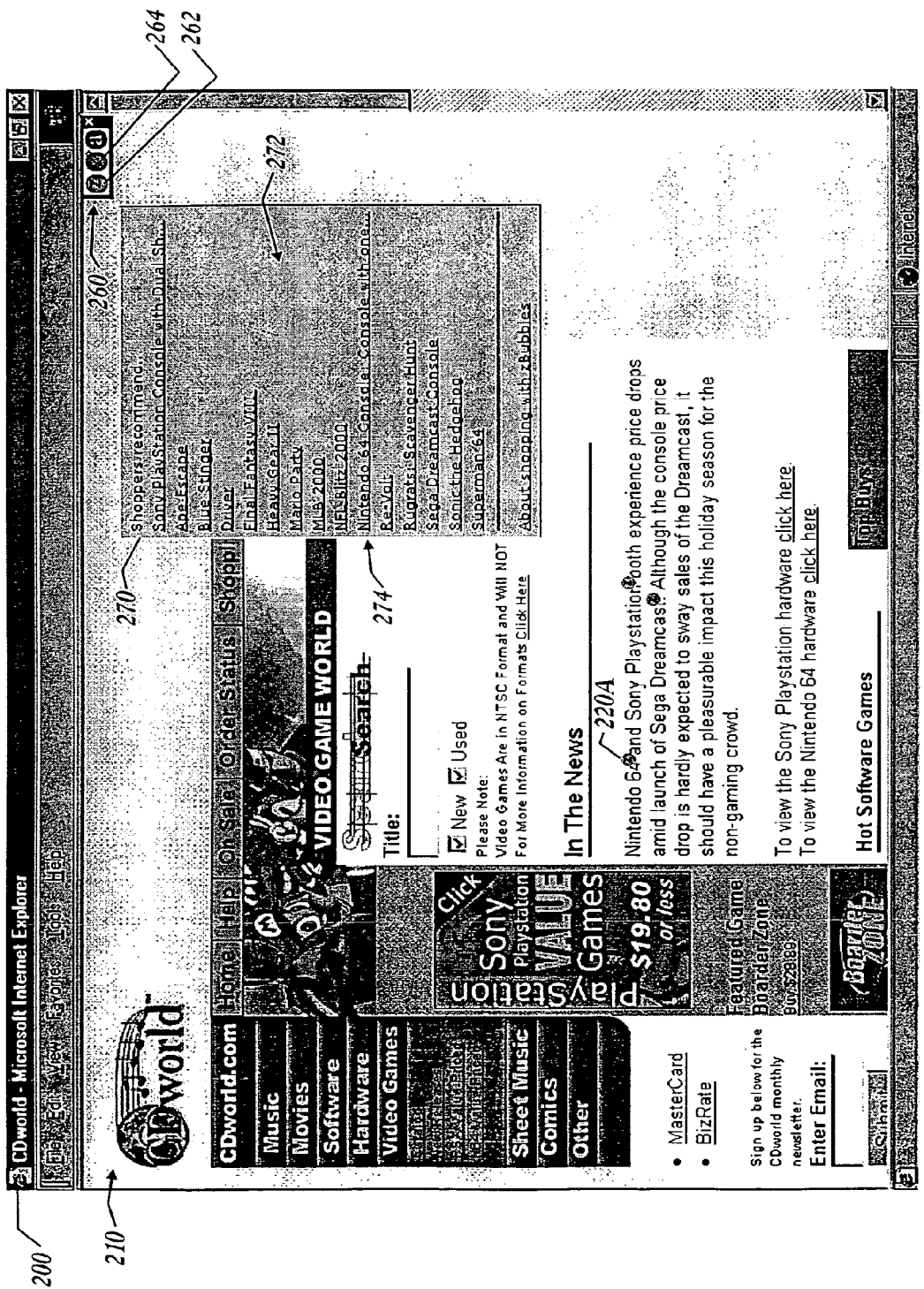

FIG. 2C illustrates a client program toolbar 260, which is preferably displayed by the client program 124 whenever the client program 124 is running. In the illustrated example, the toolbar 260 includes a first user-selectable display element or icon 262 (hereinafter "retrieve icon 262"), which appears as a "Z" in a circle. Selection of the retrieve icon 262 by the user causes the client program 124 to display a menu 270 including a list 272 of products on the web page 210 being viewed for which the data server 140 has information available. The depiction of the retrieve icon 262 is preferably varied depending upon whether the server 140 has information available for at least one product on the web page 210. If the server 140 has product-related information for at least one product, the retrieve icon 262 is highlighted in a light color; if the server 140 does not have any product information, the icon 262 is shown in a darker color.

The list 272 of products displayed in response to selection of the retrieve icon 262 preferably includes at least one additional user-selectable display element 274 (hereinafter "product list element 274"). A product list element 274 is displayed for each product represented on the web page 210 for which the data server 140 has product-related data. Selection of the product list element 274 preferably causes the client program 124 to display the same bubble 230 (or similar) as selection of the web page embedded product element 220A on the web page 210. Some of the web page embedded product elements 220 for the products included in the list 272 are not illustrated since these products are represented on a lower portion of the web page 210 that is not displayed in the illustration.

In the illustrated example, the toolbar 260 also includes a second icon 264 (hereinafter "write icon 264") through which a user can choose to provide product-related information for an illustrated product. The write icon 264 is depicted as a pencil within a circle in the illustrated example. An extensive example of the process by which a user can supply product-related information is presented below in Section II-B.

Figure 2D:
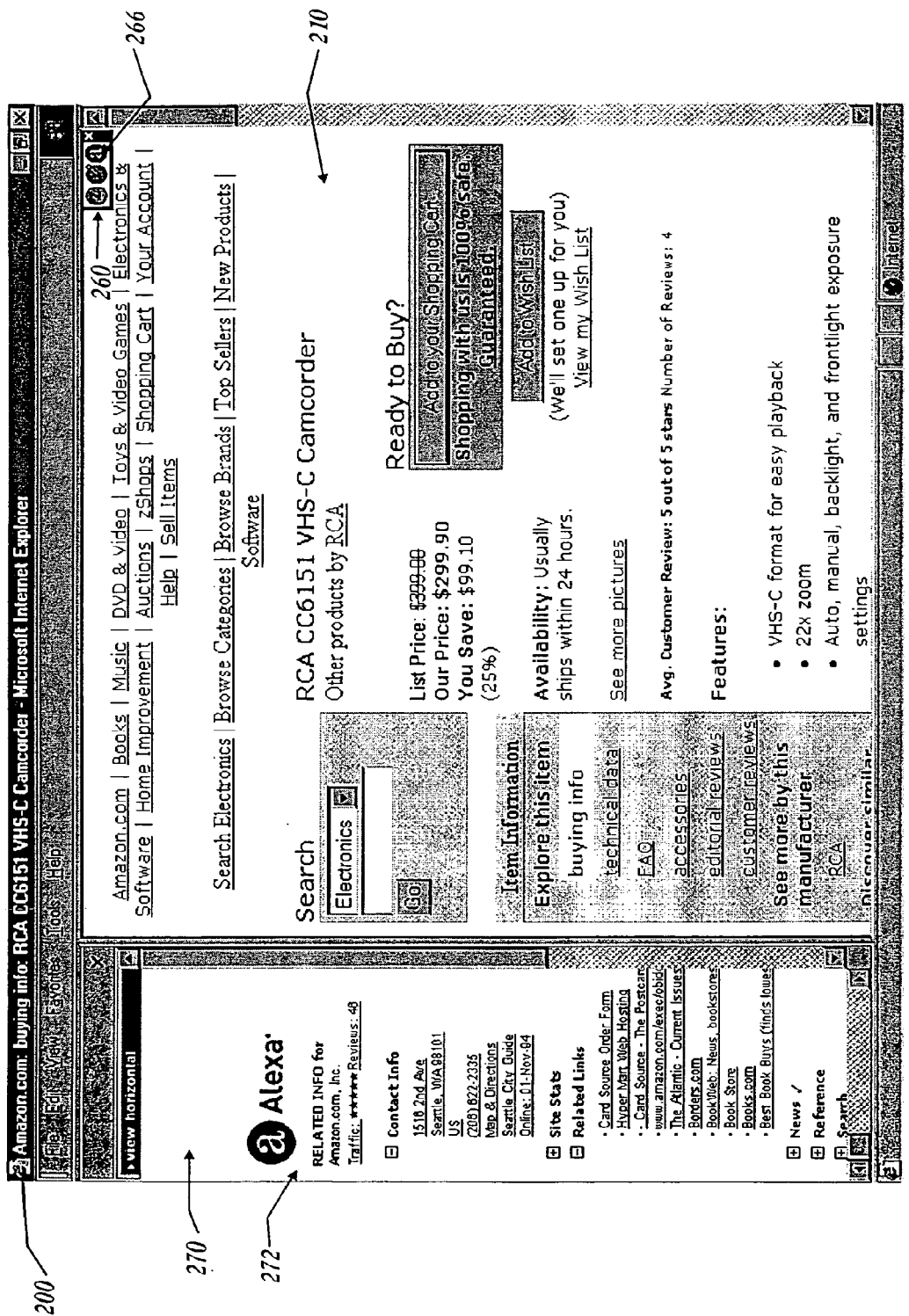

FIG. 2D illustrates the operation of a third icon 266 on the toolbar 260. Selection of the third icon 266 causes the client program 124 to display a vertical sidebar 270 in the web browser window 200. The sidebar 270 displays web page or web site related data (metadata) 272, which need not be product-related data. A client/server system supporting access to such data is disclosed in U.S. patent application Ser. No. 08/880,117 filed Jun. 21, 1997, titled METHOD AND APPARATUS FOR AUGMENTING A WEB PAGE WITH METADATA, and U.S. patent application Ser. No. 09/345,611 filed Jun. 28, 1999, titled SYSTEM AND METHOD FOR GENERATING META-DATA FOR WEB PAGES DOWNLOADABLE OVER A NETWORK SUCH AS THE WORLD WIDE WEB OR THE LIKE, which are assigned to the assignee of the present application and are hereby incorporated by reference.

B. User Scenario

FIGS. 3A-M illustrate example sequences of screen captures that show several aspects of the operation of a preferred embodiment of the present invention. In the sequences, a web page including a representation of a product is identified by a user, and the user supplies product-related information for the identified product through the client program 124. The supplied information is then displayed in bubbles subsequently displayed by any instance of the client program 124. Users are also given the opportunity to comment, through voting bubbles, on the information supplied by other users.

Figure 3A:
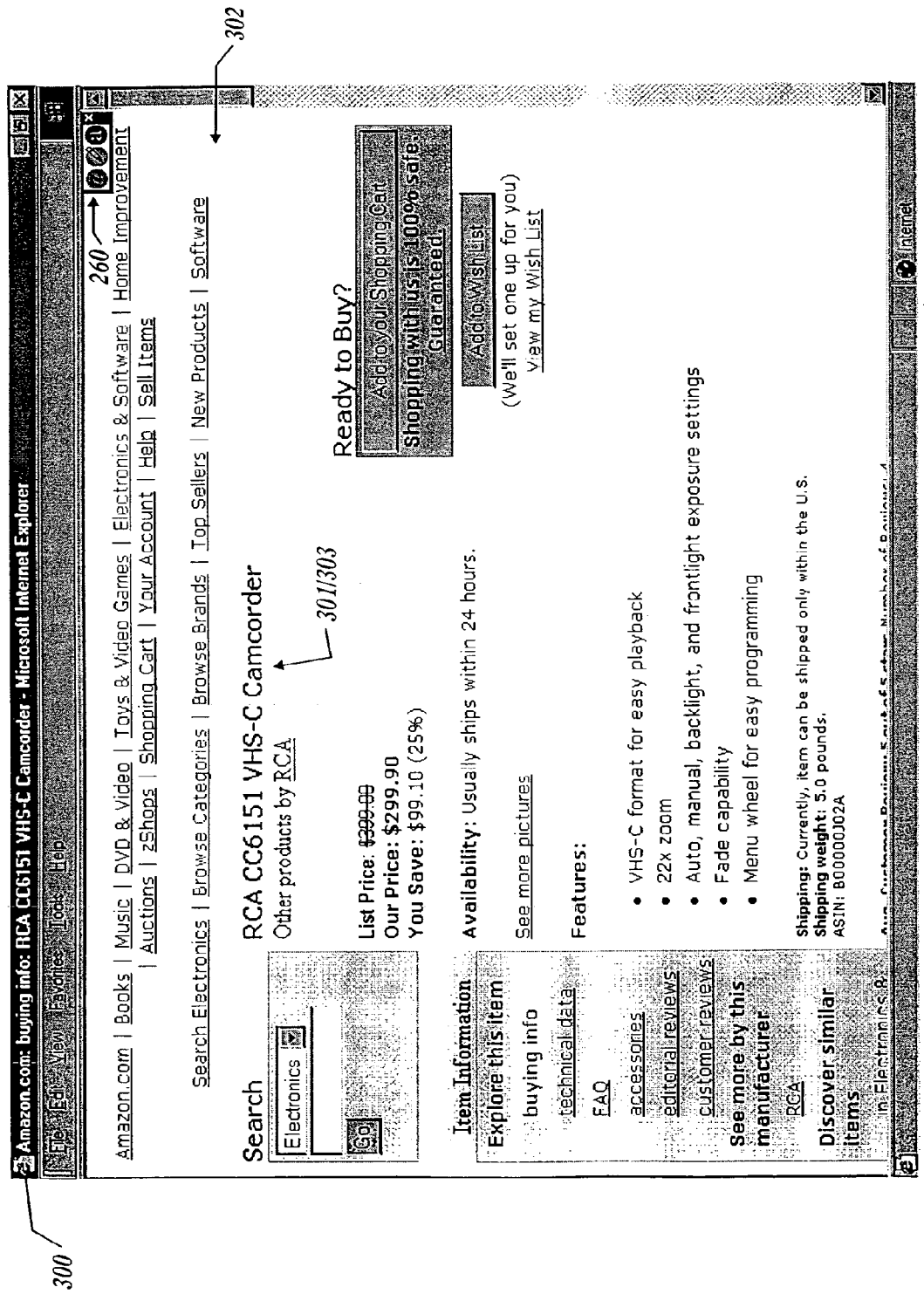
Figure 3B:
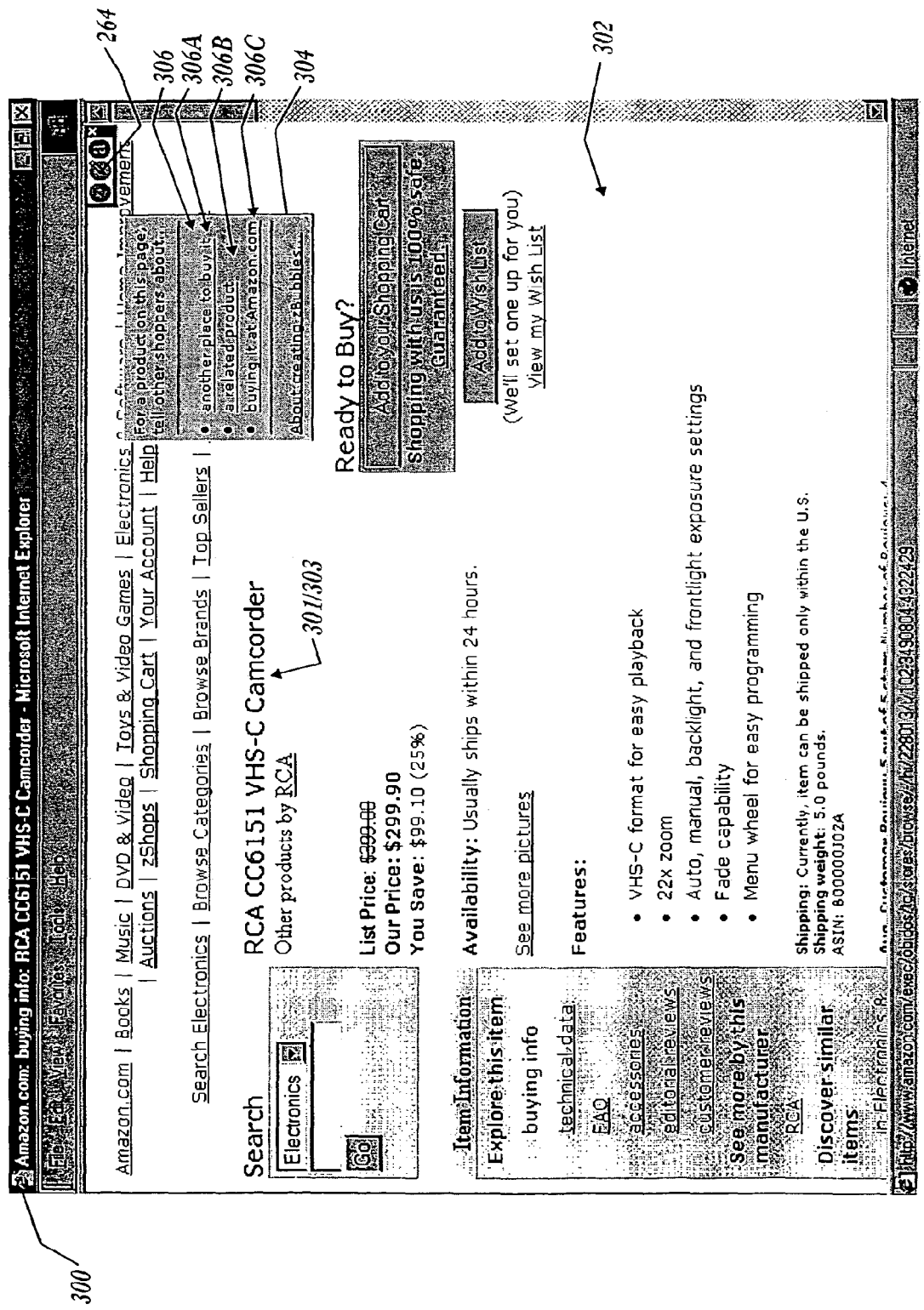
Figure 3C:
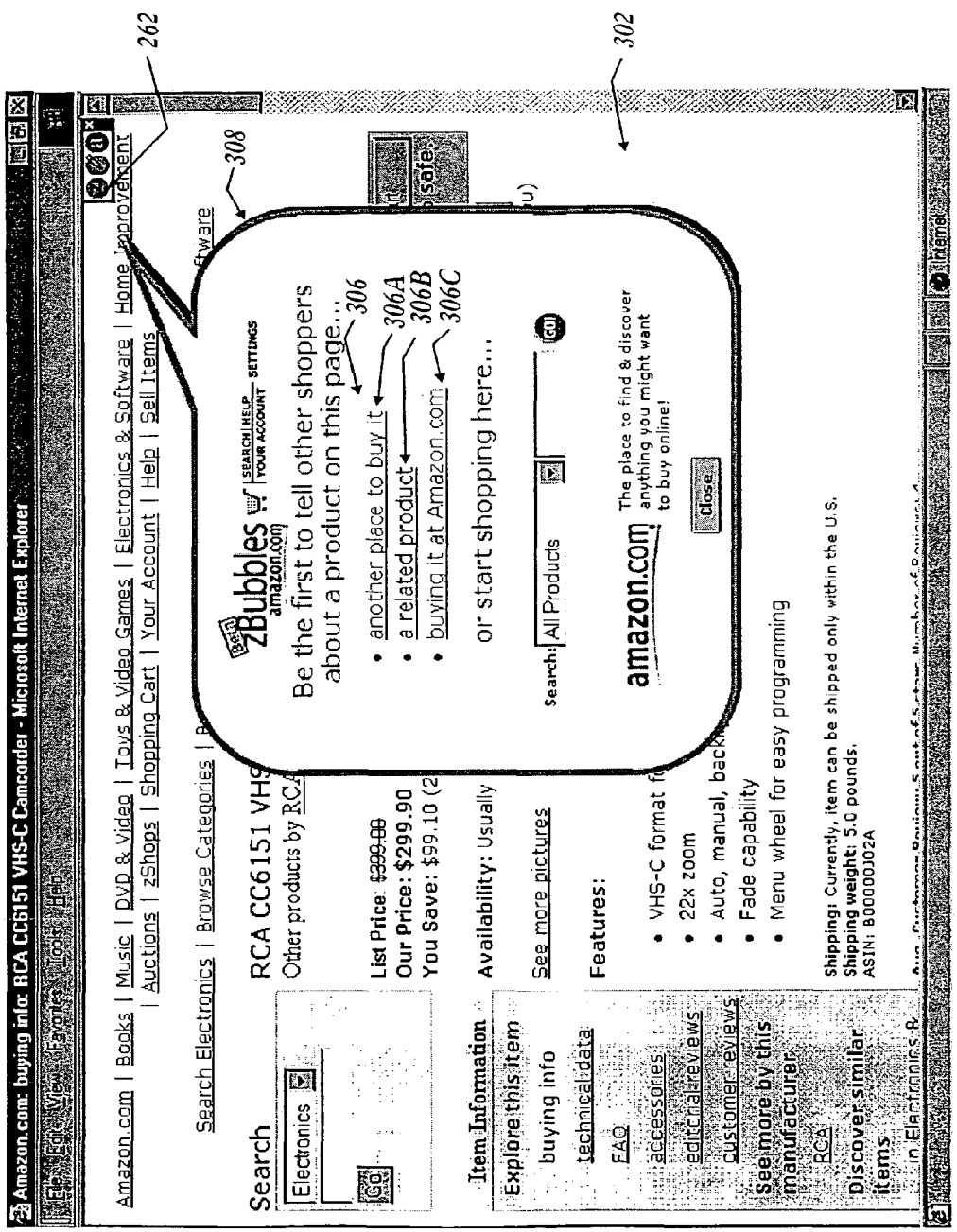

FIG. 3A shows a web page 302 including a representation 301 of a product 303, particularly an "RCA CC6151 VHS-C Camcorder." The client program toolbar 260 is shown in the upper right hand corner of the browser window 300. FIG. 3B shows the browser window 300 after the write icon 264 has been selected. Selection of the write icon 264 causes the client program 124 to display a menu 304 including a list of options 306, preferably presented by user-selectable display elements, for providing information about a product represented on the web page. The list of options 306 includes: (306A) identifying a (or another) place to buy the product, (306B) identifying a related product, and (306C) supplying information about buying the product at the featured store. Selection of each of the three options causes the client program 124 to display a different bubble through which the user supplies the information. FIG. 3C shows a bubble 308 in which the client program 124 displays the list of options 306 for providing information. In certain cases, the user may select the retrieve icon 262 in the client program toolbar 260 but the product data server 140 may not have any data about any products represented on the web page 302. In this case the bubble 308 is preferably displayed. The illustrated bubble 308 also allows users to perform a search for a product using the featured store's search engine.

Figure 3D:
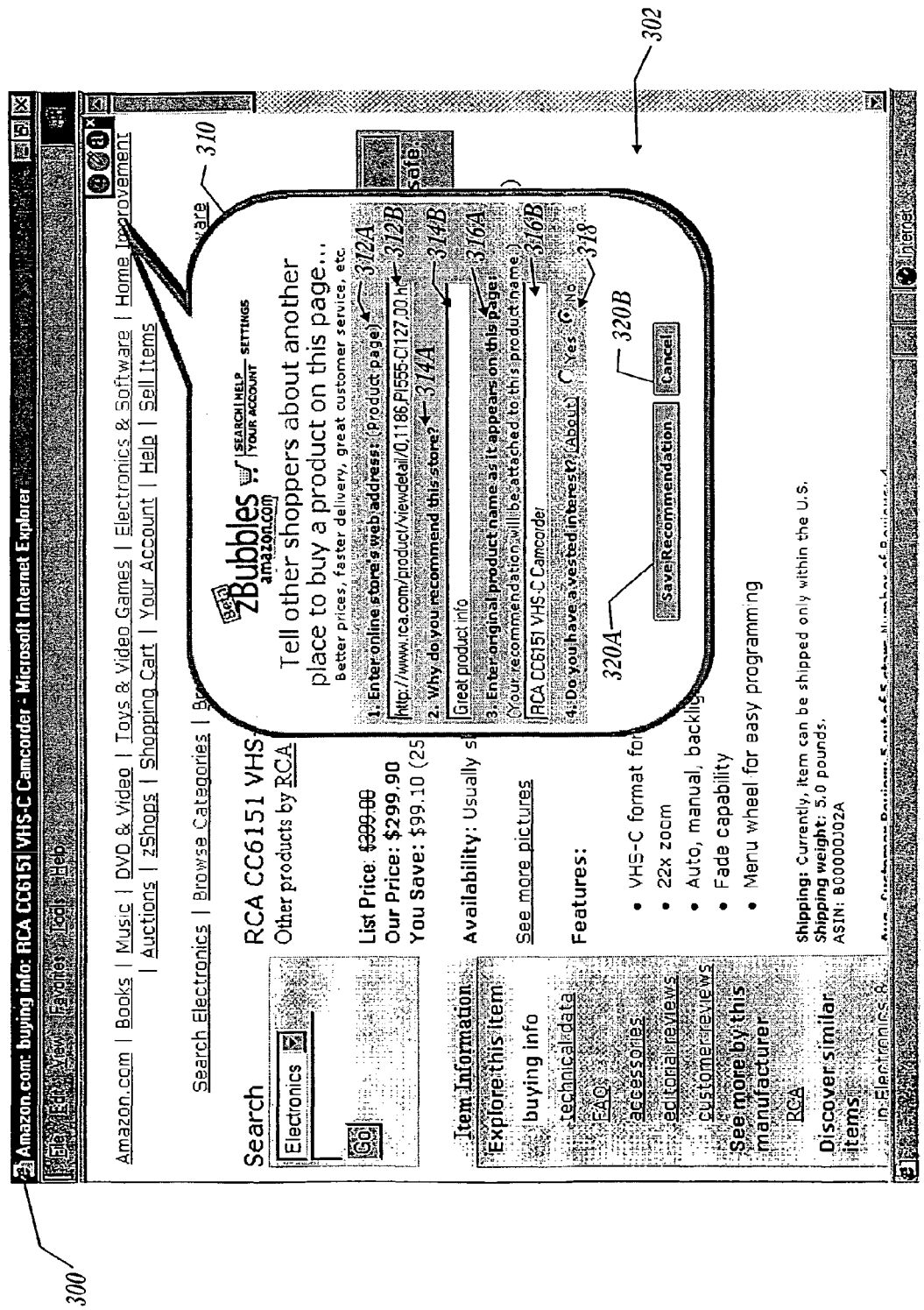

FIG. 3D shows a bubble 310 that is displayed by the client program 124 in response to selection of the first option 306A illustrated in either FIG. 3B or 3C. This bubble 310 allows a user to supply information about an (or another) on-line store at which the product 303 can be purchased. The bubble 310 includes a request 312A for the web address (uniform resource locator or "URL") of a web page of an on-line store from which the product 303 can be purchased and a corresponding text entry box 312B. The bubble 310 also includes a request 314A for a reason why the user is recommending the online store and a corresponding text entry box 314B. The bubble 310 also includes a request 316A for the original product name at it appears on the web page 302 and a corresponding text entry box 316B. The original product name is used to identify the representation 301 of the product 303 on the web page. Preferably, the client program 124 or the data server 140 checks to verify the entered name is actually present on the web page. The bubble 310 includes a request that the user indicate whether he has a vested interest in the recommended on-line store, and checkboxes 318 are provided for a response. The bubble 310 also provides a "Save Recommendation" button 320A and a "Cancel" button 320B. The "Save Recommendation" button 320A causes the client program 124 to transmit the submitted information in the form of data to the data server 140 so that it may be accessed by other users using the client program 124.

Figure 3E:
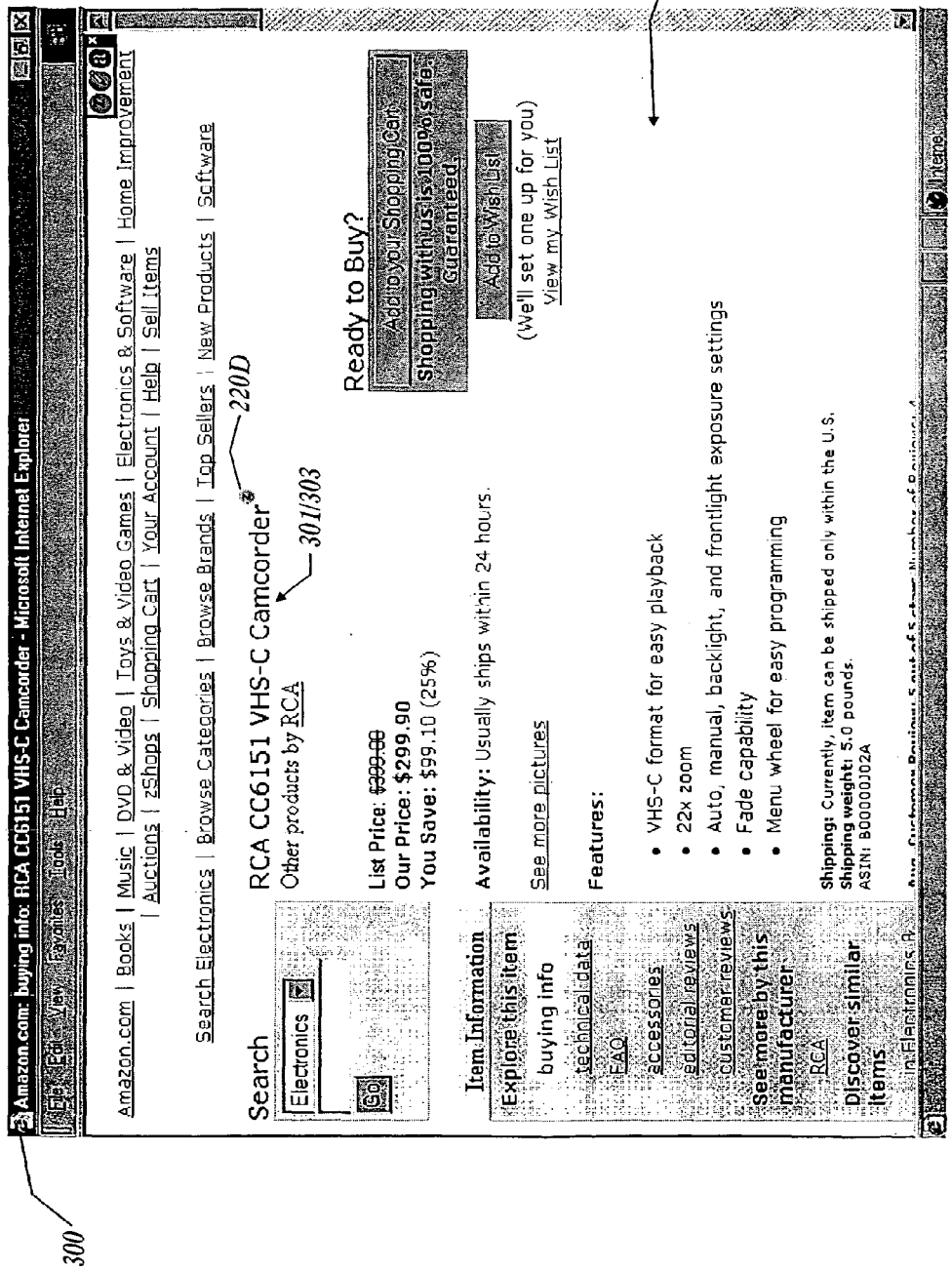

FIG. 3E shows the web page 302 as modified or supplemented by the client program 124 after a user has identified the representation 301 of the product 303. The client program 124 displays a user-selectable web page embedded product element 220D adjacent the representation 301 of the product 303. The client program 124 preferably identifies the representation 301 of the product 303 on the web page 302 by locating the first instance of the original product name. The user supplied the original product name upon making the recommendation as illustrated in FIG. 3D. In the preferred embodiment, the client program 124 uses the Document Object Model of Microsoft's Internet Explorer Version 5 or later, to modify the web page 302 as displayed by the web browser 122 to include the user-selectable web page embedded product element 220D. In an alternative embodiment, the user-selectable display element is created by modifying, augmenting, or highlighting the representation 301 of the product 303. For example, the original product name can be replaced, underlined or highlighted in order to create the user-selectable display element.

Figure 3F:
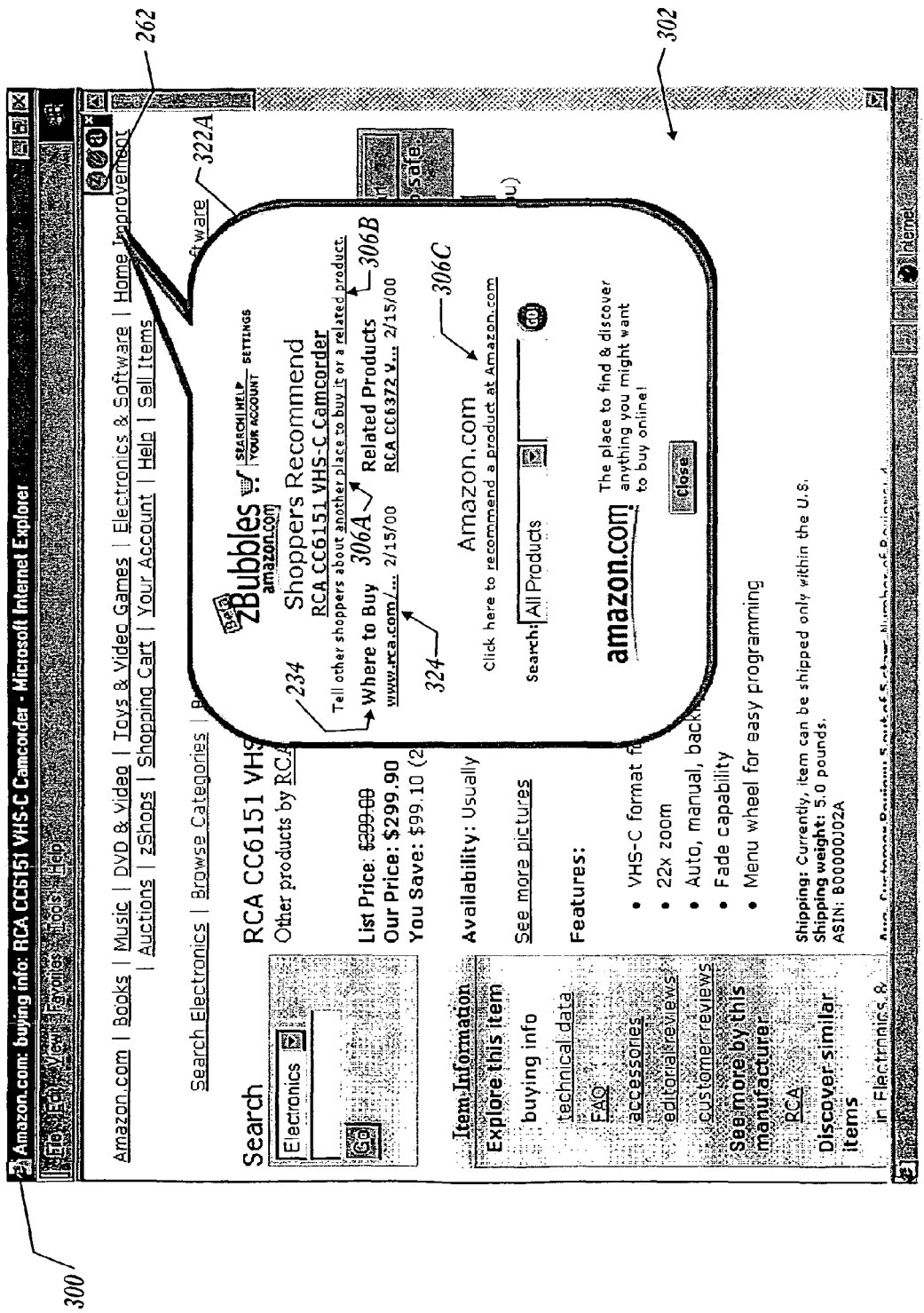

FIG. 3F illustrates a product information bubble 322A displayed by the client program 124. The product information bubble 322A can be displayed in response to the user's selection of the web page embedded product element 220D. Alternatively, the bubble 322A can be displayed in response to the user's selection of a representation of the product 303 from a list of products 272 in a menu 270 (e.g, as in FIG. 2C). If only one product has been identified on the web page 302, the client program 124 can display the bubble 322A after the user clicks on the retrieve icon 262 in the toolbar 260 without first presenting the menu 270. The product information bubble 322A is similar to the product information bubble 230 of FIG. 2B except that a different product is identified, and the "Where to Buy" section 234 is filled in rather than the featured store section 238. A hypertext link 324 to the web page identified in FIG. 3D is now included in the "Where to Buy" section 234. Clicking on the hypertext link 324 drives the web browser 122 to a web page 326 (FIG. 3G) on the web site of a store at which the product can be purchased. The web page 326 is the one previously identified by a user as illustrated in FIG. 3D. In the bubble 322A, options 306A-C for providing information about the identified product are also included.

Figure 3G:
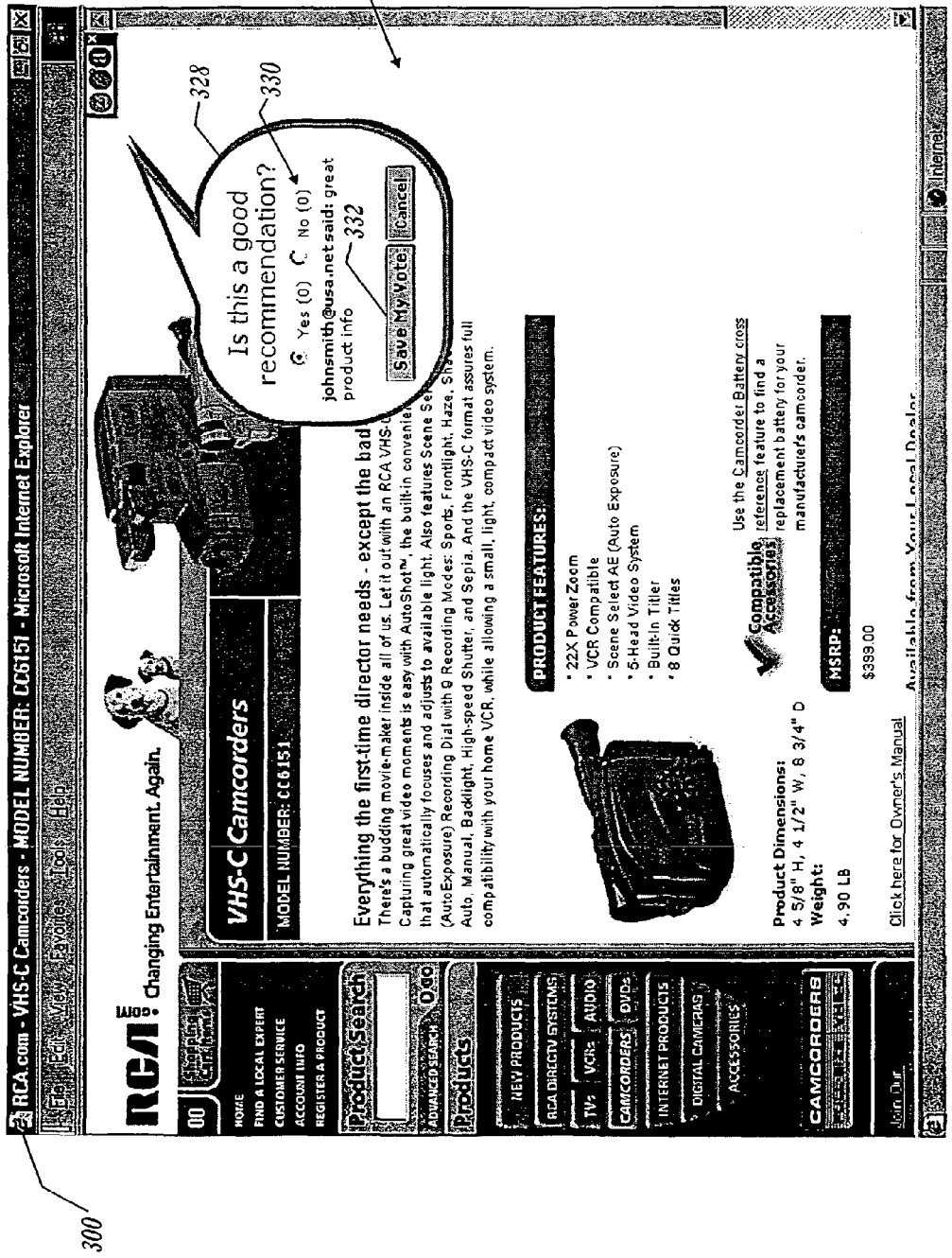

FIG. 3G shows an example web page 326 displayed by the web browser 122 in response to a user's selection of the link 324 in the "Where to Buy" section 234 of the bubble 322A. When a user first follows the link 324, the client program 124 displays a vote bubble 328 in conjunction with the web page 326. The vote bubble 328 allows the user to vote on whether the recommendation is a good one or not using checkboxes 330. A "Save My Vote" button 332 allows the user to save his vote to the data server 140. The tallied votes are preferably displayed in parentheses next to each voting checkbox 330. In one embodiment, the vote bubble 328 shows the comments and identity of the user that recommended the web page 326.

Figure 3H:
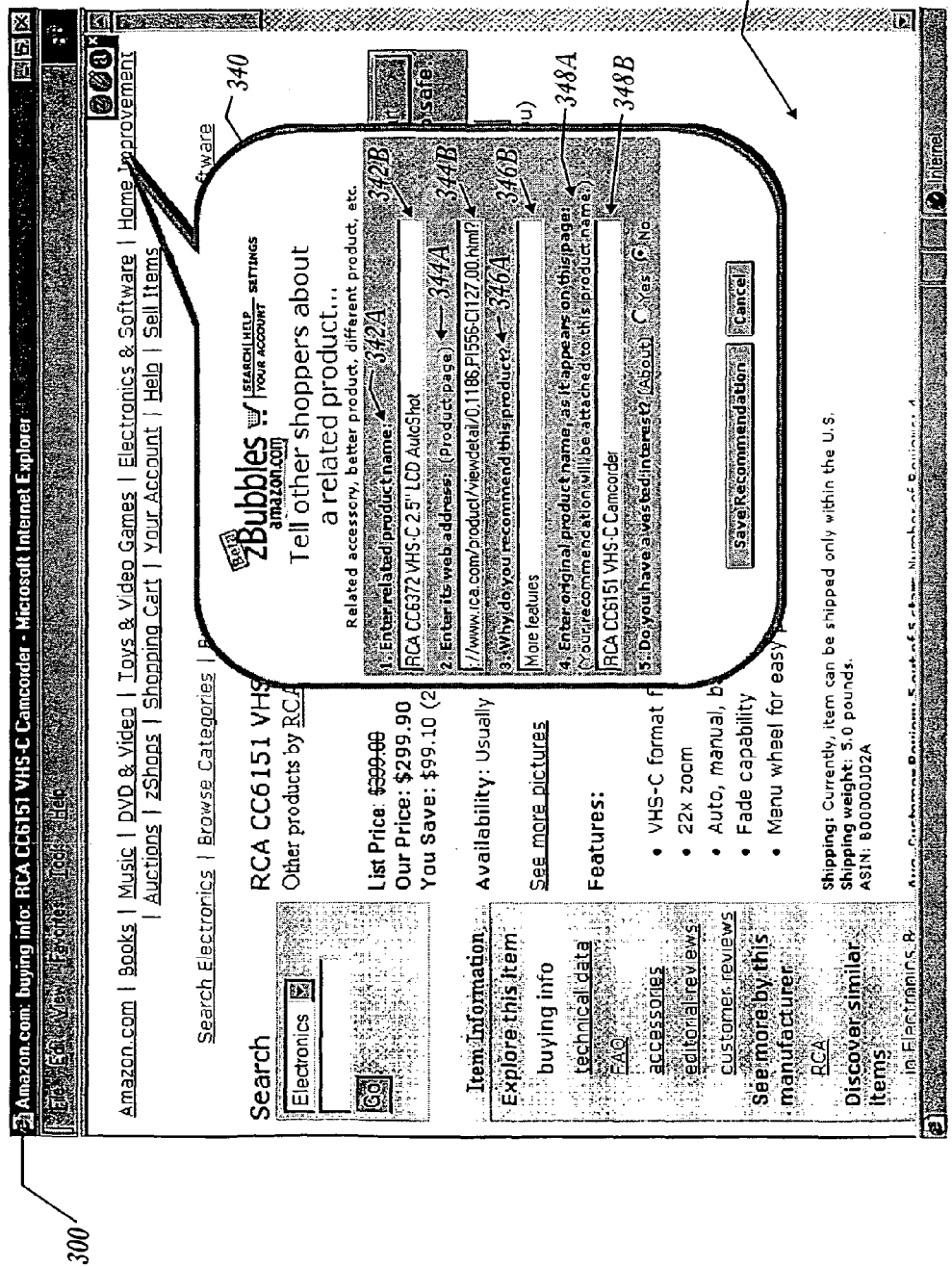
Figure 31:
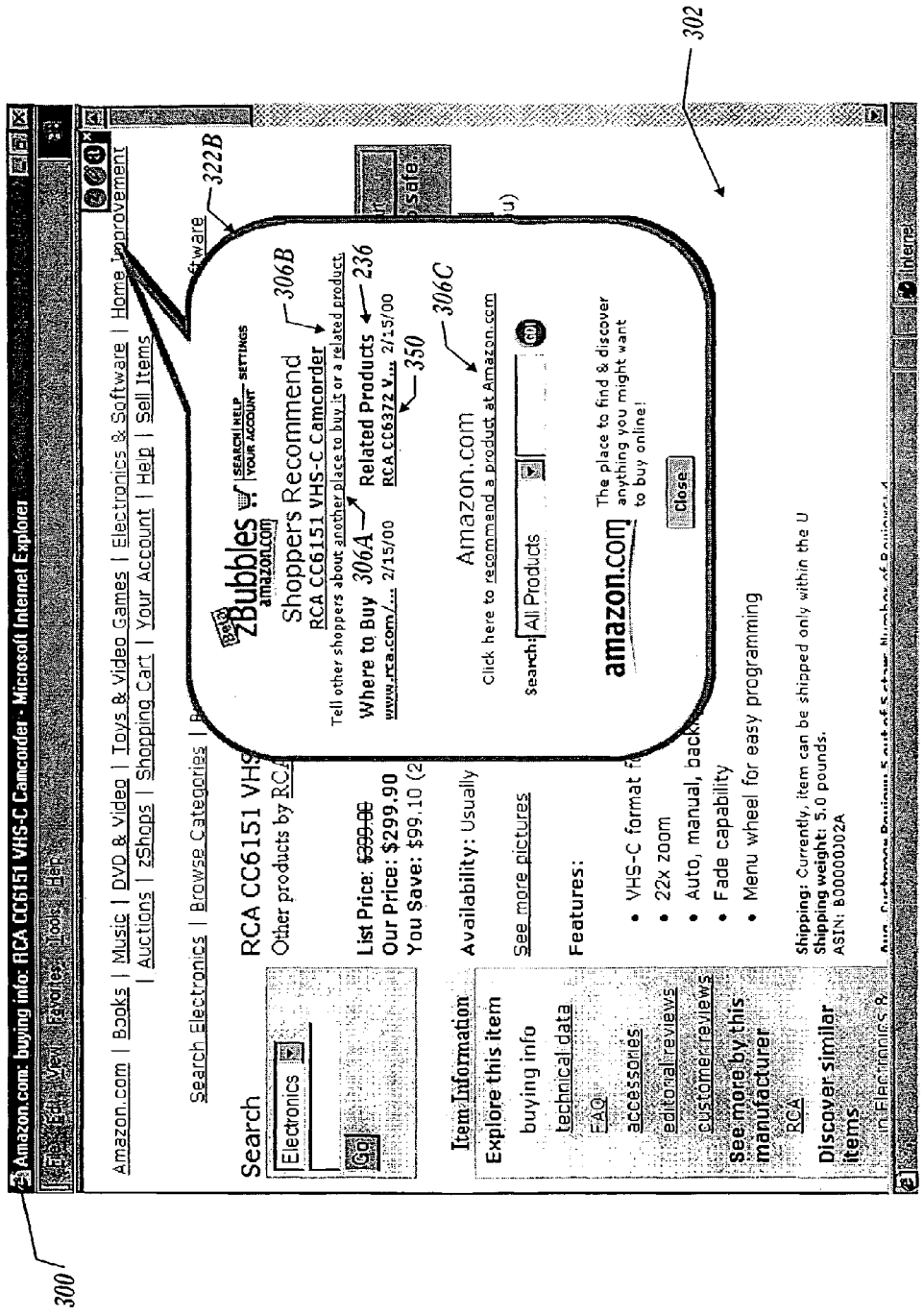

FIG. 3H shows a bubble 340, similar to the bubble 310 of FIG. 3D, that is displayed by the client program 124 in response to selection of the second option 306B illustrated in either FIG. 3B or 3C. This bubble 340 allows a user to supply information about a product that is related to the identified product 303. The bubble 340 includes a request 342A for the name of the related product and a corresponding text entry box 342B. The bubble 340 also includes a request 344A for the web address (URL) of a web page upon which the related product can be found and a corresponding text entry box 344B. The bubble 340 also includes a request 346A for a reason why the user is recommending the related product and a corresponding text entry box 346B. The bubble 340 also includes a request 348A for the original product name at it appears on the web page 302 and a corresponding text entry box 348B.

FIG. 3I illustrates a second product information bubble 322B displayed by the client program 124. The product information bubble 322B can be opened in the same ways as the product information bubble 322A of FIG. 3F. The product information bubble 322B is similar to the bubble 322A, however, the "Related Products" section 236 also includes a hypertext link 350. The hypertext link 350 links to the web page, previously identified by a user, which displays the related product. Clicking on the hypertext link 350 drives the web browser 122 to the related product's web page and causes the client program 124 to display a vote bubble such as shown in FIG. 3G.

Figure 3J:
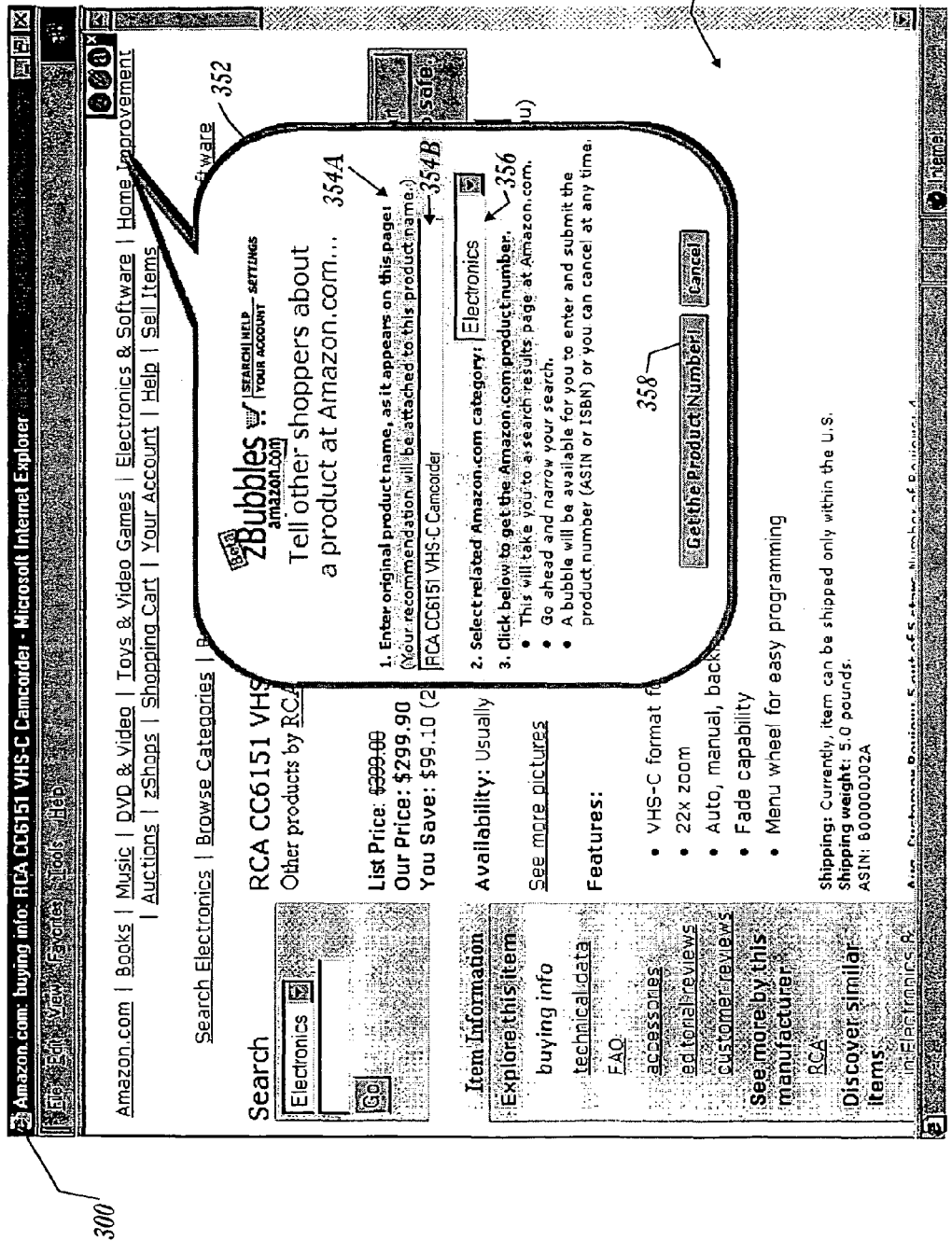

FIG. 3J shows a bubble 352 that is displayed by the client program 124 in response to selection of the third option 306C illustrated in either FIG. 3B or 3C. This bubble 352 allows a user to supply information about purchasing the represented product 303 at a featured on-line store, which in this case is Amazon.com. The bubble 352 includes a request 354A for the original product name at it appears on the web page 302 and a corresponding text entry box 354B. The bubble 352 also includes a category selection box 356 that prompts the user to select a category of products within which to search for the identified product 303 at the featured store. Selection of a "Get the Product Number" button 358 causes the client program 124 to drive the browser to a search results page (not illustrated) or a product page 360 (FIG. 3K) at the featured store.

Figure 3K:
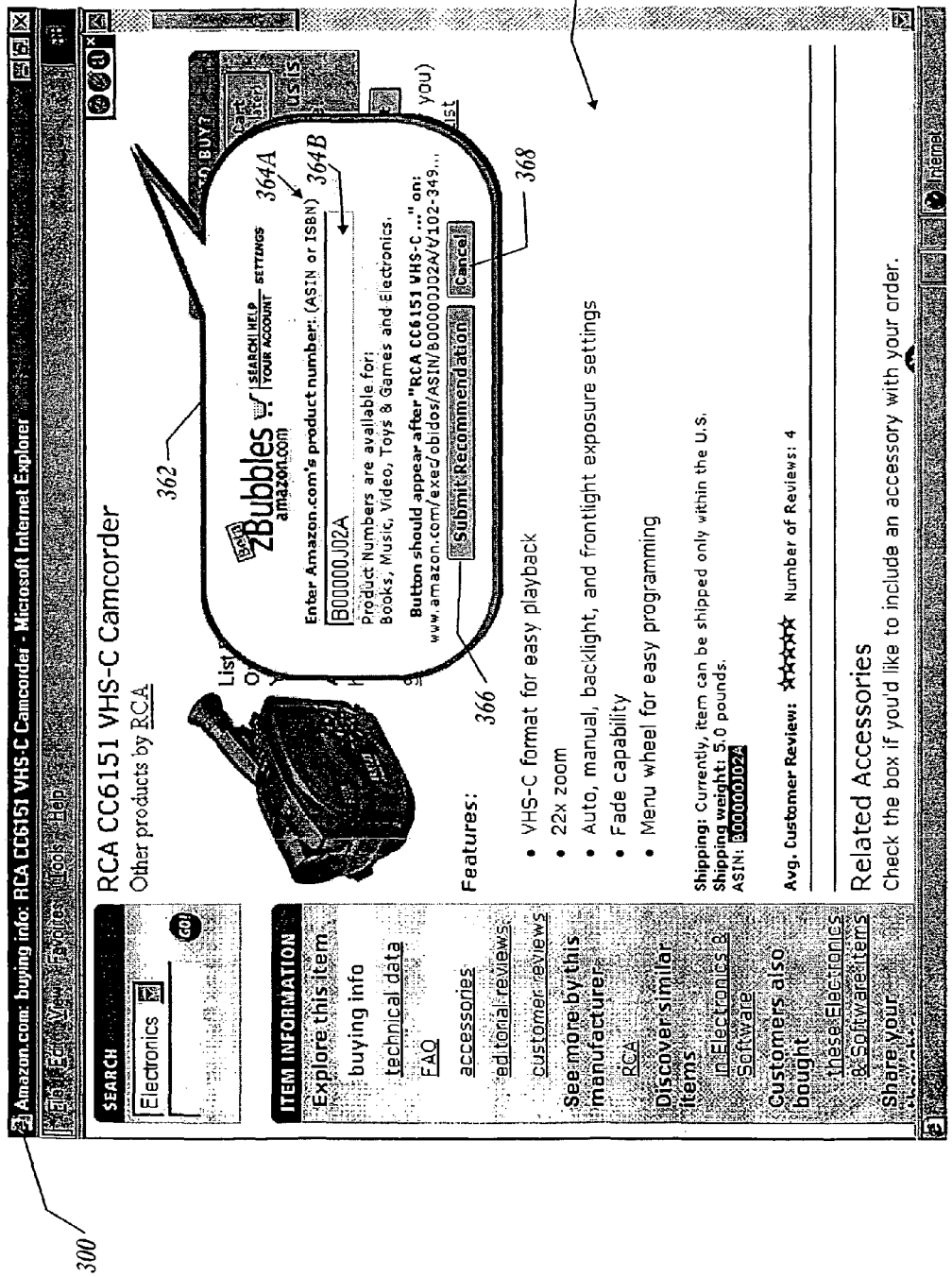

FIG. 3K shows the product page 360 at the featured store. The product page 360 may be reached after the user follows one or more links from a search results page (not illustrated) subsequent to clicking the "Get Product Number" button 358. The client program 124 displays a bubble 362 that includes a request 364A for the featured store's product number for the identified product 303 as well as a corresponding text entry box 364B. The client program 124 preferably displays the bubble 362 in conjunction with each web page viewed after the web page 302 until the user either clicks a "Submit Recommendation" button 366 or a "Cancel" button 368 in the bubble 362.

Figure 3L:
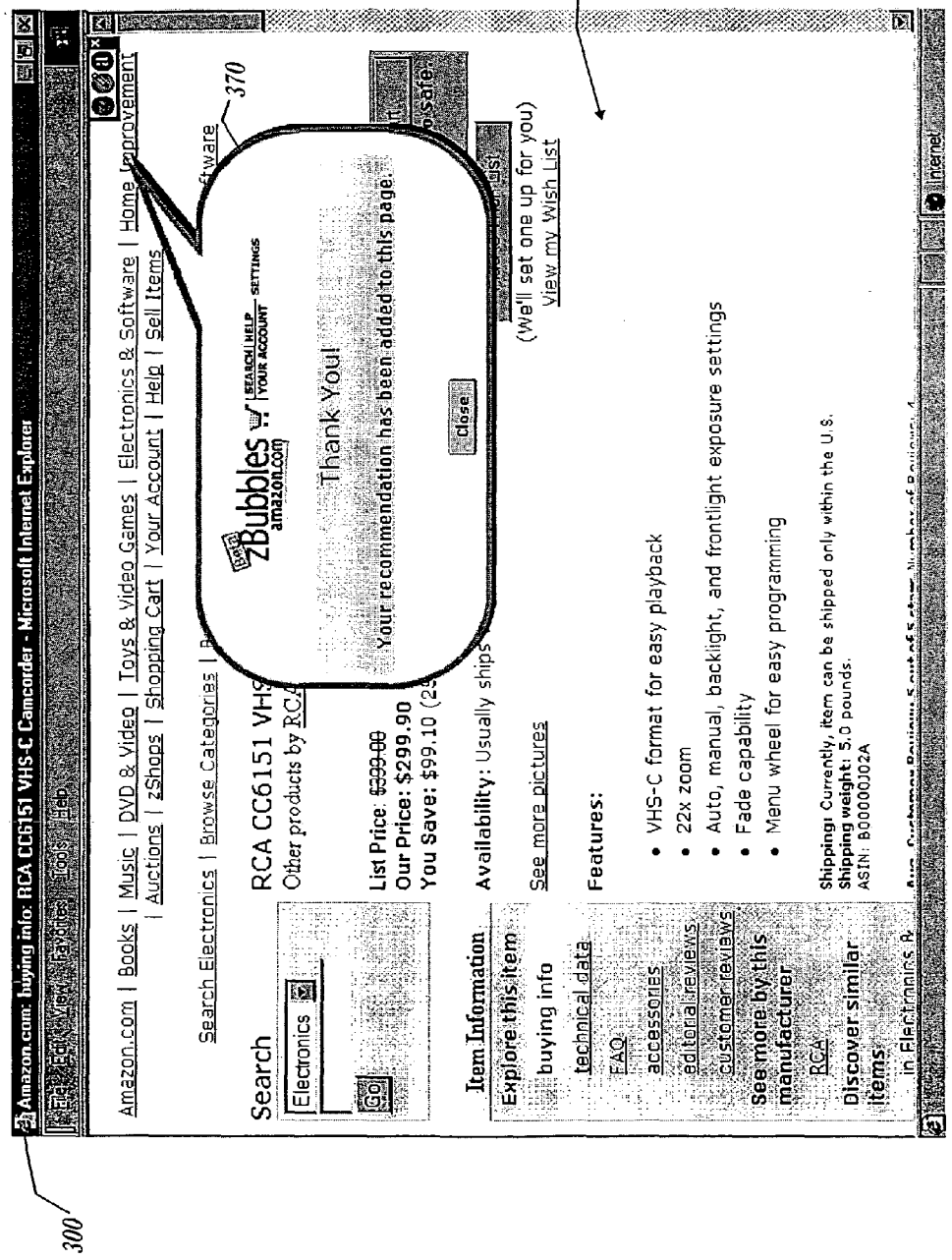

Once the user adds the recommendation the client program 124 preferably drives the browser back to the original product page 302 and displays a "Thank You" bubble 370 as illustrated in FIG. 3L. The thank you bubble 370 is preferably also displayed after the user adds other recommendations as well, such as after FIG. 3D and FIG. 3H.

Figure 3M:
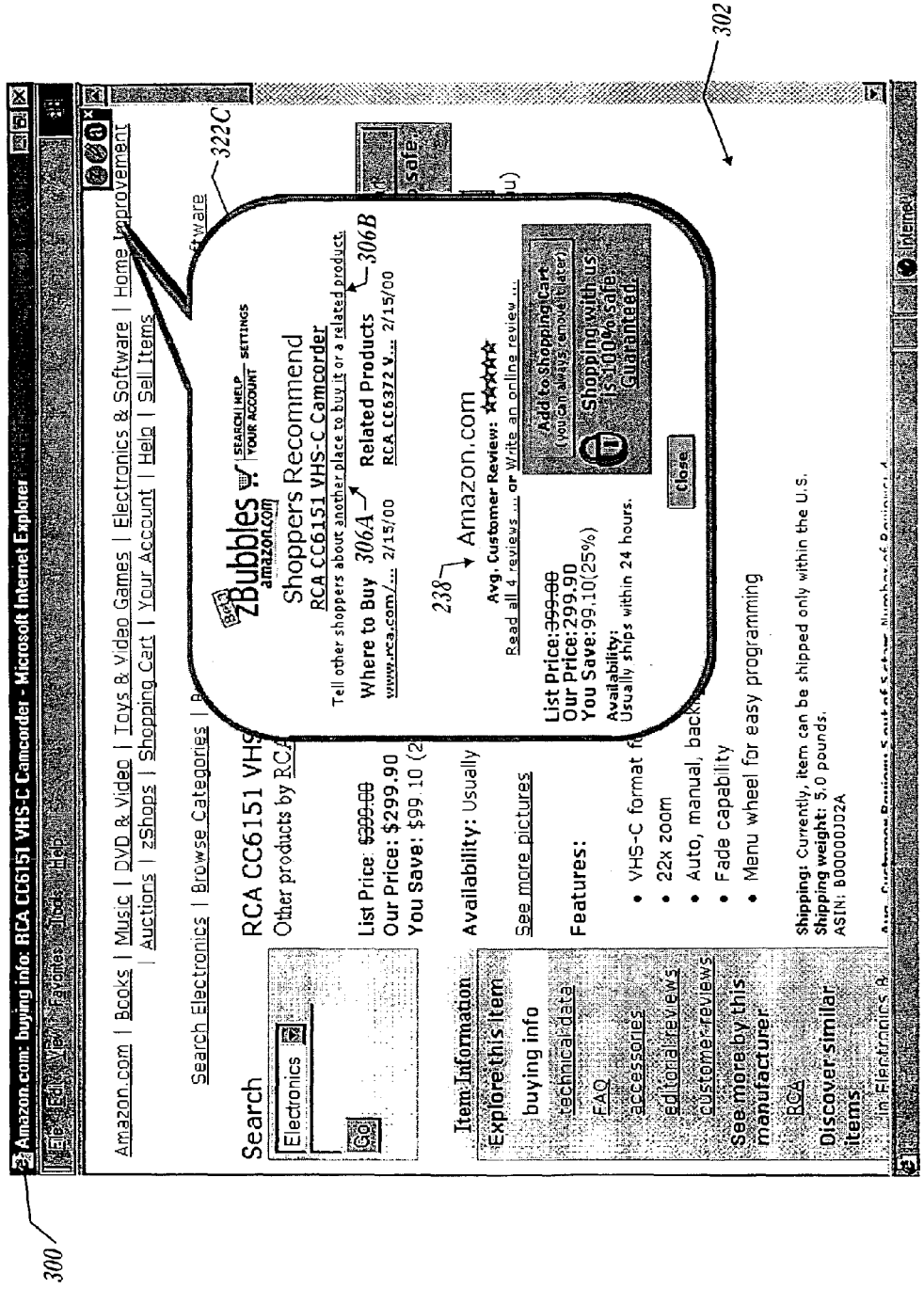
Figure 4A:
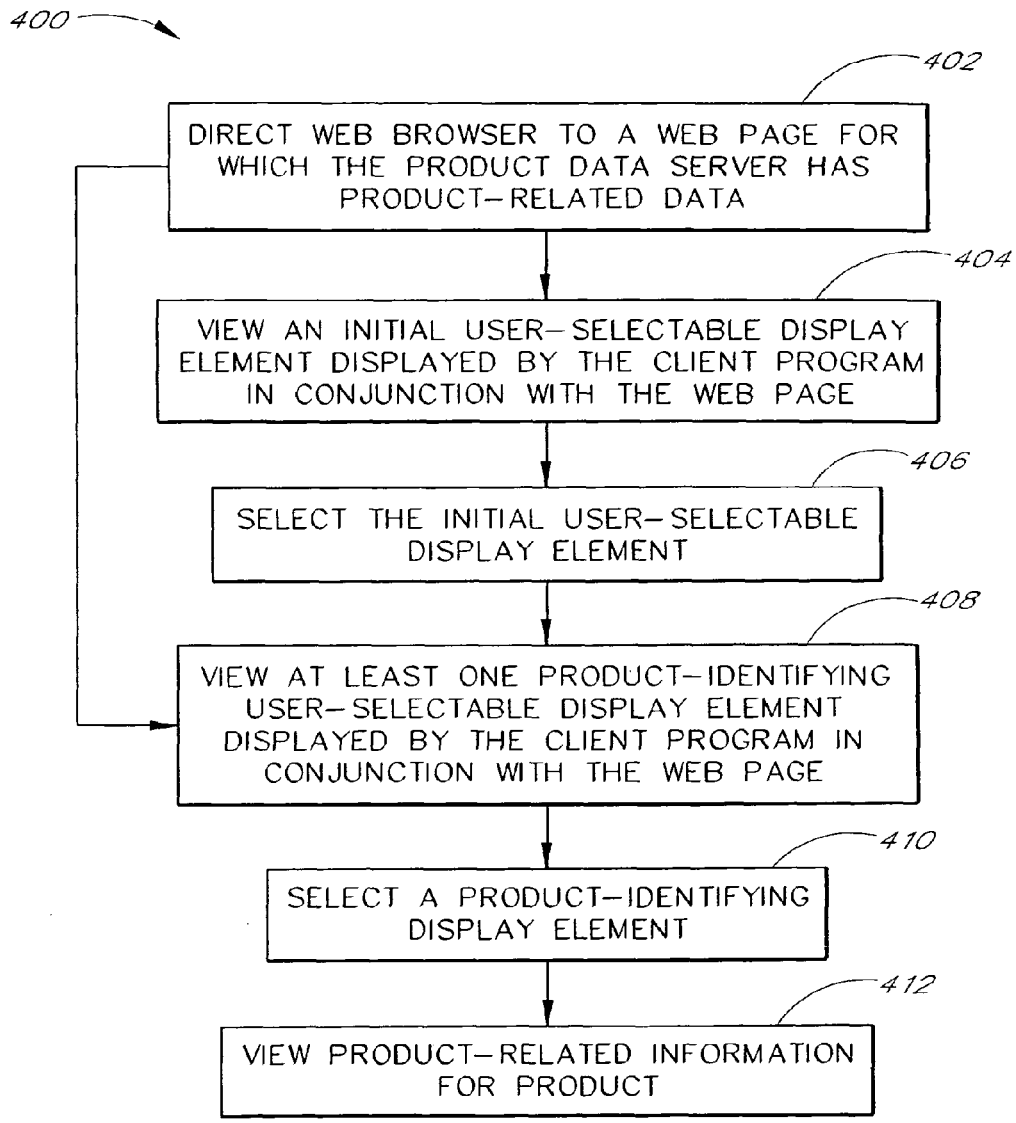
FIG. 4A illustrates a preferred process in accordance with which a user accesses data about a product represented on a web page.

FIG. 3M shows a third product information bubble 322C displayed by the client program 124. The product information bubble 322B can be opened in the same ways as the product information bubble 322B of FIG. 3I. The product information bubble 322C is similar to the bubble 322B, however, the featured store section 238 has been completed. The contents of the featured store section 238 are described above in Section II-A with reference to FIG. 2B. The third product information bubble 322C, as well as the second product information bubble 322B allow users to continue to recommend additional on-line stores at which to purchase the product and additional related products through the options C. User Methods FIG. 4A illustrates a preferred process 400 in accordance with which the user accesses data about a product represented on a web page. At a step 402, the user directs the web browser 122 to a web page for which the product data server 140 has product-related data. The web page may be, for example, the web page 302 illustrated in FIG. 2A, and the product may be, for example, the Nintendo 64 Console mentioned in the text of the page 302.

At a step 404, the user views an initial user-selectable display element displayed by the client program 124 in conjunction with the web page. The initial display element may be, for example, the retrieve icon 262 displayed in the client program toolbar 260 as shown in FIG. 2C. At a step 406, the user selects the initial user-selectable display element. In response to the user's selection in the step 406, the client program 124 preferably displays a list of products represented on the web page for which the data server 140 has available data. The list may be, for example, the list 272 displayed in the menu 270 of FIG. 2C.

At a step 408, the user views at least one product-identifying user-selectable display element displayed by the client program 124 in conjunction with the web page. In a first scenario, the product-identifying display element may be, for example, the product list element 274 included in the list 272 on the menu 270 of FIG. 2C.

In a second scenario, the process 400 flows from the step 402 directly to the step 408, bypassing the steps 404 and 406. In this scenario, the product-identifying user-selectable display element of the step 408 is preferably already displayed by the client program 124 in conjunction with the web page adjacent a representation of a product. For example, the product-identifying display element may be one of the web page embedded product elements 220A-C of FIG. 2A.

At a step 410, the user selects a product-identifying display element. In response to the user's selection of the display element, the client program 124 displays product-related data for the identified product. The product-related data may be, for example, the data displayed in any of the product information bubbles 322A-C of FIGS. 3F, 3I, and 3M. The data may include: the URL of a web page of an on-line store at which the product may be purchased; the URL of a web page of a related product; and/or a URL that allows the product to be purchased at a featured store. At a step 412, the user views the displayed product-related information.

Figure 4B:
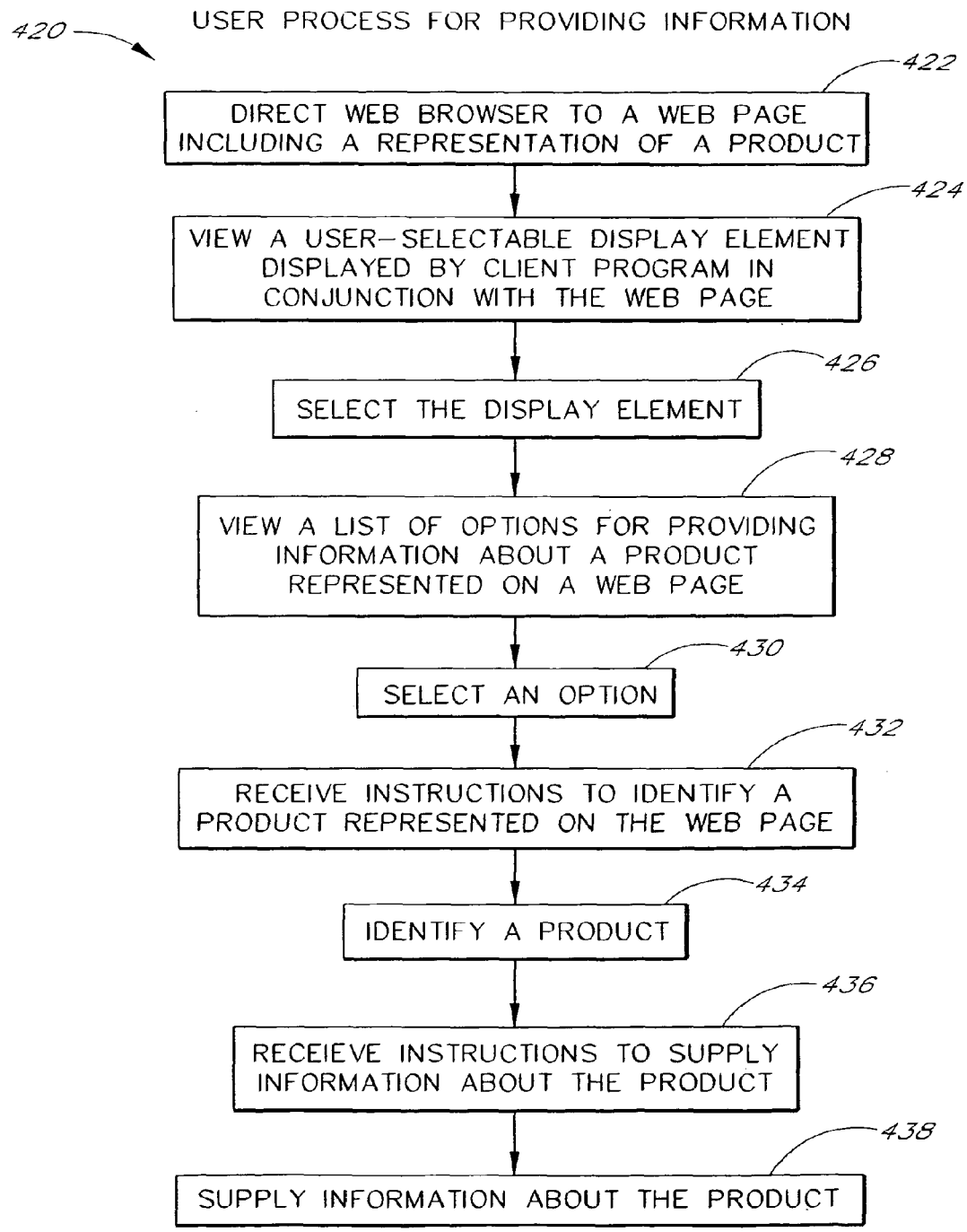
FIG. 4B illustrates a preferred process in accordance with which the user provides information about a product represented on a web page.

FIG. 4B illustrates a preferred process 420 in accordance with which the user provides information about a product represented on a web page. At a step 422, the user directs the web browser 122 to a web page that includes a representation of a product. The web page may be, for example, the web page 302 of FIG. 3A. At a step 424, the user views a user-selectable display element displayed by the client program 124 in conjunction with the web page. The display element may be, for example, the write icon 264 or the retrieve icon 262 of the client program toolbar 260 as illustrated in FIG. 2C. The display element may alternatively be a web page embedded product element 220 in the case the user wishes to provide additional information for a product about which the server 140 already has some information.

At a step 426, the user selects the display element viewed in the step 424. In response to the user's selection of the display element, the client program 124 displays options for providing information about a product represented on the web page. In one case, the display element selected by the user is the write icon 264. In this case, the client program 124 displays the list of options 306 in a menu 304 as illustrated in FIG. 3B. In another case, the display element selected by the user is the retrieve icon 262. In this case, the client program 124 displays a bubble including options for providing information. The bubble may be the bubble 308, as illustrated in FIG. 3C, including the list of options 306. The bubble may alternatively be any of the product information bubbles 322A-C including the options 306A-C as illustrated in FIGS. 3F, 3I, and 3M.

At a step 428, the user views the options displayed by the client program 124. At a step 430, the user selects one of the options for providing information about a product. The user preferably makes a selection by clicking on one of the options.

At a step 432, the user receives instructions to identify a product represented on the web page. The instructions may be, for example, the request 316A in the bubble 310 for the original product name as illustrated in FIG. 3D. The instructions are preferably accompanied by a mechanism that allows the user to submit information identifying the product. The mechanism may be, for example, the text box 316B corresponding to the request 316A as illustrated in FIG. 3D.

At a step 434, the user identifies a product represented on the web page. The user preferably identifies the product by supplying the name of the product in the text box 316B. In addition or alternatively, the user preferably identifies a representation of the product on the web page. In one embodiment, the product is represented on the web page in the form of text and the user is prompted to supply this same text in the text box 316B. This same text allows the client program 124 or the data server 140 to identify the representation of the product on the web page by matching the supplied text. In this embodiment, the user both identifies the product and the representation of the product by supplying the product name. In one embodiment, the client program 124 may allow the user to identify the representation of the product by prompting the user to click on the representation of the object on the web page. In one embodiment, the user may be prompted to drag a display element, such as the web page embedded product element 220A in FIG. 2A, from a bubble to a location on the web page adjacent a representation of the product. In this embodiment, data server 140 subsequently causes the web page embedded product element 220A to be displayed to other users in the same location as that to which the user dragged the element 220A.

In one scenario, in the step 430, the user chooses an icon that is already associated with a product identified on the web page, such as a web page embedded product element 220. In response, the client program 124 displays a bubble, such as the bubble 322A of FIG. 3F including options for supplying information for the identified product. The user then selects one of the options. In this scenario, the steps 432 and 434 can be skipped and control passes directly from the step 430 to a step 436 since the product has already been identified.

At a step 436, the user receives instructions to supply information about the identified product. The instructions may include, for example, the request 312A in the bubble 310 for the web address of a web page of an on-line store from which the identified product can be purchased. Each request is preferably accompanied by a mechanism that allows the user to submit the requested information. A mechanism may be, for example, the text box 312B corresponding to the request 312A as illustrated in FIG. 3D.

At a step 438, the user supplies the requested information about the product. In one case, the user already knows and can supply the information. In a second case, the user can search for the requested information on the web. When the user finds the information, the user can enter it using the available mechanism(s). In a third case, the bubble provides tools with which the user can find the requested information. The tools may include, for example, the search utility provided through the featured store's information request bubble 352 as illustrated in FIG. 3J.

III. The Client Program

The client program 124 executes in conjunction with the web browser 122 on the user computer 120 and communicates with the data server 140 to obtain product-related data, which it then presents to the user. The client program 124 preferably also receives product-related information from the user and transmits the information as data to the data server 140. In the preferred embodiment, the client program 124 is configured to execute in conjunction with the Microsoft Internet Explorer (IE) web browser. It will be apparent to one skilled in the art how to adapt the client program 124 to function in conjunction with alternative web browsers.

A. Client Program Components

Figure 5:
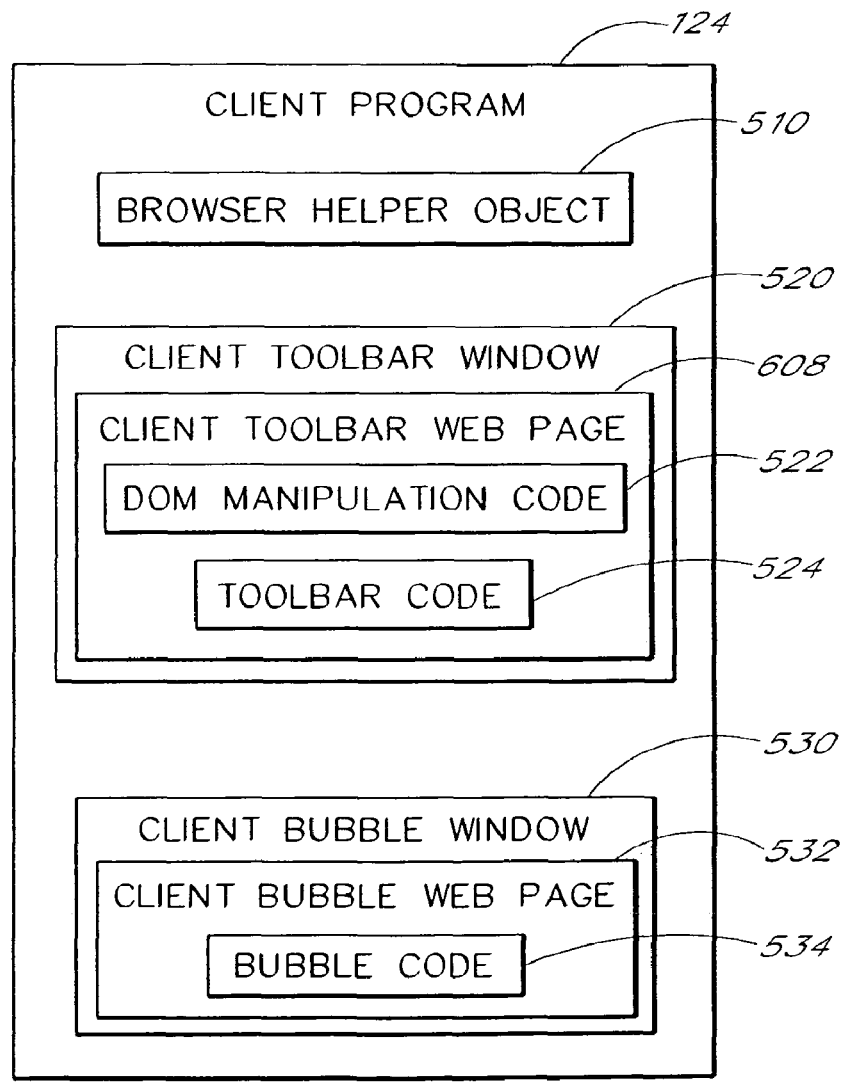
FIG. 5 illustrates a block diagram of a preferred embodiment of the client program.

FIG. 5 illustrates a block diagram of a preferred embodiment of the client program 124. A browser helper object (BHO) 510 is preferably the first object of the client program 124 that is instantiated by the web browser 124. In general, BHOs are specific to the IE web browser. BHOs can be attached to a running instance of IE, run in conjunction with IE in the same program space, and are capable of manipulating the execution of IE. Additional information on BHOs, which are well known in the art, is available from Microsoft at msdn.microsoft.com. The BHO 510 is preferably compiled as a binary file and included in a dynamically linked library (DLL) accessed by the web browser 124. The BHO 510, upon being instantiated, preferably creates an instance of a client toolbar window 520. In the preferred embodiment, the BHO 510 has little or no additional functionality other than creating the toolbar window 520. In alternative embodiments, additional functionality can be included in the BHO 510.

Figure 6:
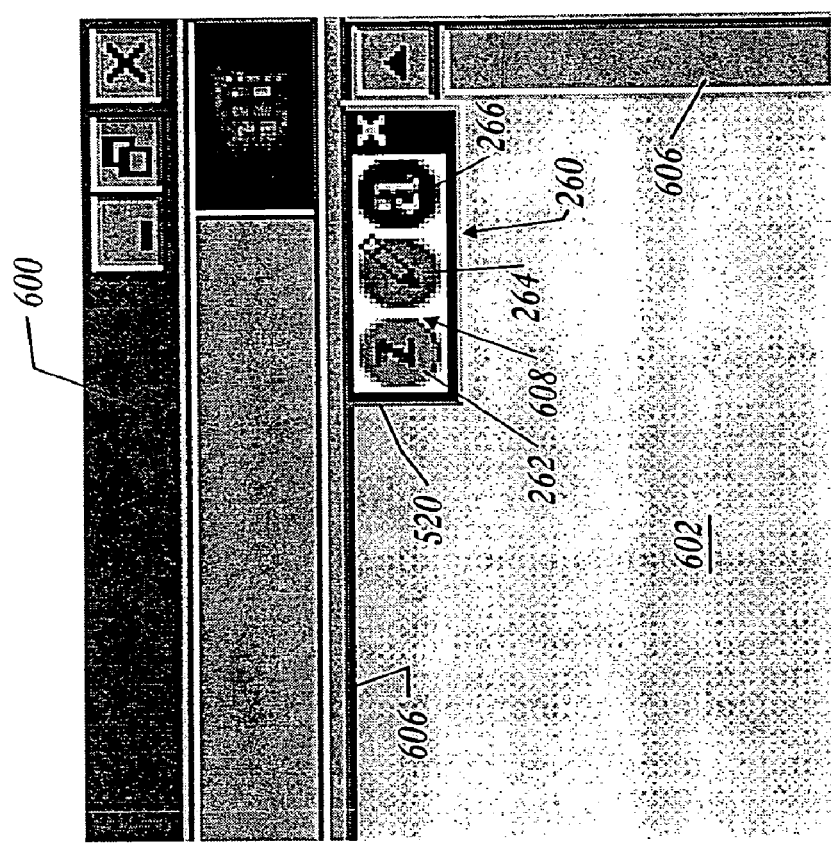
FIG. 6 illustrates a portion of a web browser window including a preferred embodiment of a client toolbar window.

FIG. 6 illustrates an upper right hand portion of a web browser window 600 including a preferred embodiment of the client toolbar window 520. Initially, the client toolbar window 520 is preferably created as a 0×0 pixel window. Once created, the toolbar window 520 determines the uniform resource locator (URL) of the web page 602 loaded in the HTML window 606. The HTML window 606 is the window in which the web browser displays the web page 602. The toolbar object 520 then transmits the URL to the data server 140, which returns a client toolbar web page 608 that is displayed in the client toolbar window 520 as the client toolbar 260. In displaying the client toolbar web page 608, the toolbar window 520 expands to accommodate the size of the client toolbar web page 608.

The client toolbar window 520 is preferably instantiated as a child of the web browser's HTML window 606 to allow the toolbar window to be easily positioned using the coordinate system of the HTML window 606. Consequently, each time the web browser 122 loads a new web page, the client toolbar window 520 preferably reassociates itself as a child of the new HTML window 606. Again, the client toolbar window 520 determines the URL of the web page 602 loaded in the new HTML window 606 and proceeds to request a new client toolbar web page 608 from the data server 140 as described above.

Referring again to FIG. 5, the client toolbar web page 608 preferably includes Document Object Model (DOM) manipulation code 522 in the form of Javascript. The DOM manipulation code 522 is executed to add the web page embedded product elements 220 (FIG. 2A) adjacent product representations on the displayed web page 602 by manipulating the web browser's DOM. The DOM manipulation code 522 can also be used to make other modifications to the web page 602. Document Object Model manipulation of loaded web pages using Javascript is well known in the art.

The client toolbar web page 608 preferably also includes toolbar code 524 in the form of Javascript. The toolbar code 524 defines the functionality of the user-selectable icons 262, 264, and 266 in the toolbar 260. The toolbar code 524 is preferably also configured to display additional menus, for example, the menu 270 of FIG. 2C, in response to the user's selection of the icons 262, 264, and 266.

The toolbar code 524 is also preferably configured to create bubbles such as the bubble 310 of FIG. 3D. Each bubble is preferably created in the form of a client bubble window 530, which is preferably a child of the web browser window 600, but may be a child of the HTML window 606. The client bubble window 530 loads a client bubble web page 532 from the data server 140. The rendering of the client bubble web page 532 in the bubble window 530 is what is viewed by the user. The client bubble web page 532 may also contain client bubble code 534, preferably in the form of Javascript, that implements any desired active functionality of the bubble, such as driving the web browser 122 to a different web page. One example of Javascript is discussed with reference to the "Get Product Number" button 358 of FIG. 3J.

The client program 124 is preferably implemented as program code, which may include binary as well as interpreted code. Some of the program code may be resident on the user computer 120 and some of the code may be loaded dynamically as the client program 124 executes. In the preferred embodiment, the browser helper object 510, the client toolbar window 520, and the client bubble window 530 are binary components that provide a Component Object Model (COM) interface, which is well known in the art. The client toolbar web page 608 and the client bubble web page 532 are preferably loaded from the data server 140 by the windows 520 and 530.

B. Client Program Methods

Figure 7A:
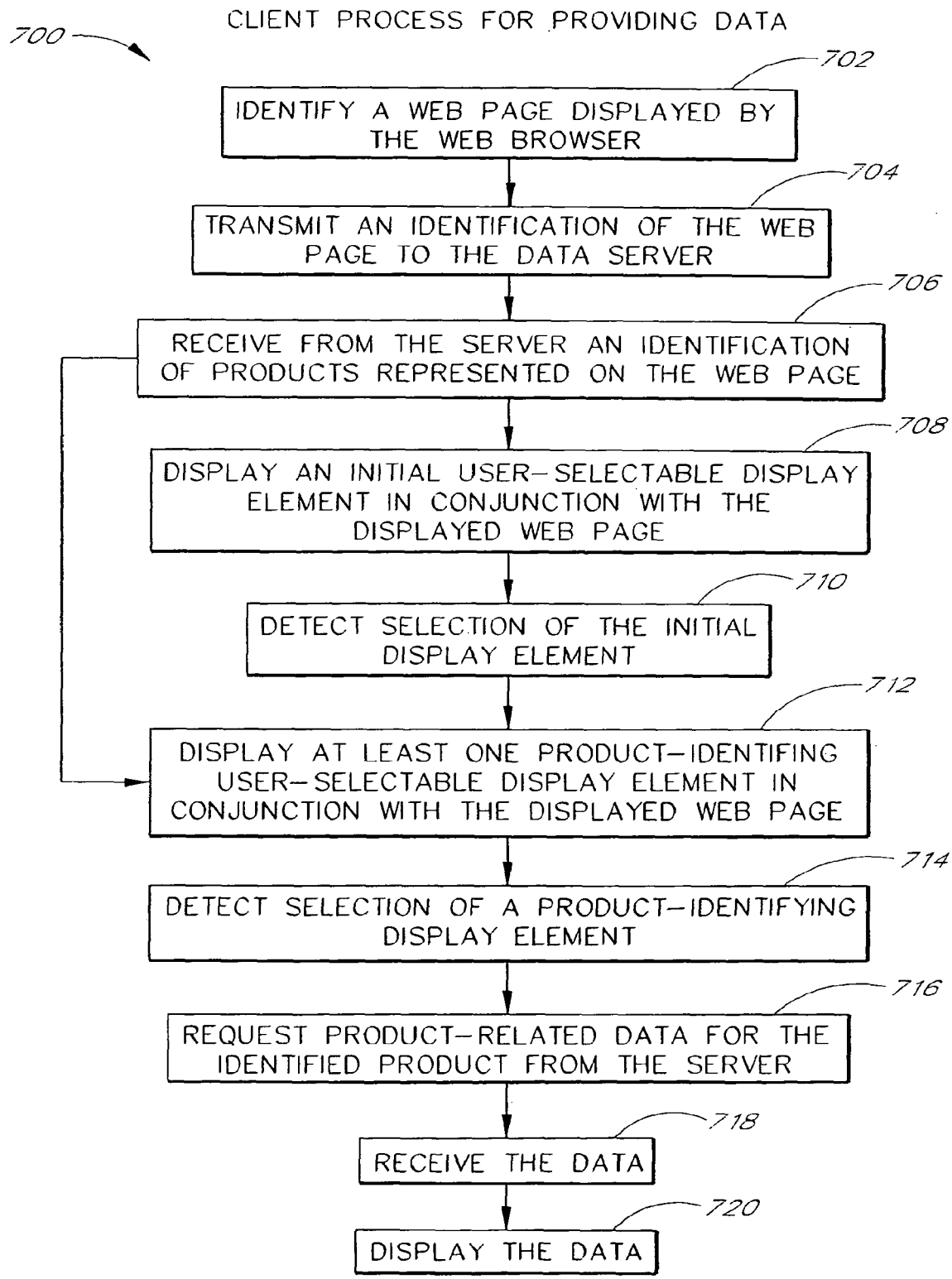
FIG. 7A illustrates a preferred process in accordance with which the client program provides product-related data.

FIG. 7A illustrates a preferred process 700 in accordance with which the client program provides product-related data. At a step 702, the client program identifies a web page displayed by the web browser. The client program preferably identifies the displayed web page by the obtaining the uniform resource locator (URL) of the web page from the web browser. The URL serves as the identifier of the web page.

At a step 704, the client program transmits an identification of the web page to the data server. To perform the step 704, the client program preferably transmits the URL of the displayed web page in conjunction with a hypertext transfer protocol (HTTP) request for the client toolbar web page 608. The URL can be encoded with the HTTP request using the GET or POST methods, which are well-known in the art.

At a step 706, the client program receives, from the data server, an identification of the products represented on the web page. In the preferred embodiment, the client program receives a client toolbar web page 608 from the data server. The identification is preferably included in the client toolbar web page 608 in the form of embedded code, which is preferably Javascript. The embedded code, which preferably includes the DOM manipulation code 522 and the toolbar code 524, will be described in greater detail in conjunction with subsequent steps. If the data server does not have an entry for the web page, no products are identified by the toolbar web page 608.

At a step 708, the client program displays an initial user-selectable display element in conjunction with the displayed web page. The client program preferably displays the initial display element by displaying the client toolbar web page 608 received from the data server. The initial display element is displayed, for example, as the icon 262 (FIG. 2C) on the client toolbar web page 608. At a step 710, the client program detects selection of the initial display element.

At a step 712, the client program displays at least one product-identifying user-selectable display element in conjunction with the displayed web page. In a first scenario, in response to step 710, the client program displays a menu, for example, the menu 270 of FIG. 2C, by executing the toolbar code 524 in response to selection of the initial display element in the step 710. The menu lists the product-identifying user-selectable display elements, such as the product list element 274 of FIG. 2C.

In a second scenario, the process 700 flows from the step 706 to the step 712, skipping the steps 708 and 710. In this scenario, the client program displays the product-identifying display elements, such as the web page embedded product elements 220 of FIG. 2A, adjacent representations of the associated products on the displayed web page. Each product-identifying display element identifies its associated product based upon its proximity to the representation of the product on the displayed web page. In this scenario, the client program preferably executes the DOM manipulation code 522 embedded in the client toolbar web page 608 to add the display elements to the web page. In the preferred embodiment, the representations of the products on the displayed web page are identified by matching the name of each product within the DOM. Once the name of a product has been located within the DOM, a display element is added adjacent the name.

At a next step 714, the client program detects selection of a product-identifying display element. Based upon the selection of the display element, the client program is able to identify the product about which the user desires to receive product-related information.

At a step 716, the client program requests, from the data server, product-related data for the product identified by the selected display element. The request is preferably transmitted in the form of an HTTP request for a client bubble web page 532. The HTTP request is preferably encoded to incorporate an identification of the product.

At a step 718, the client program receives the data from the data server. The data server preferably returns to the client program the client bubble web page 532 in which the data is preferably incorporated.

At a step 720, the client program displays the data. The client program preferably displays the data by displaying the client bubble web page 532 in the client bubble window 530.

Figure 7B:
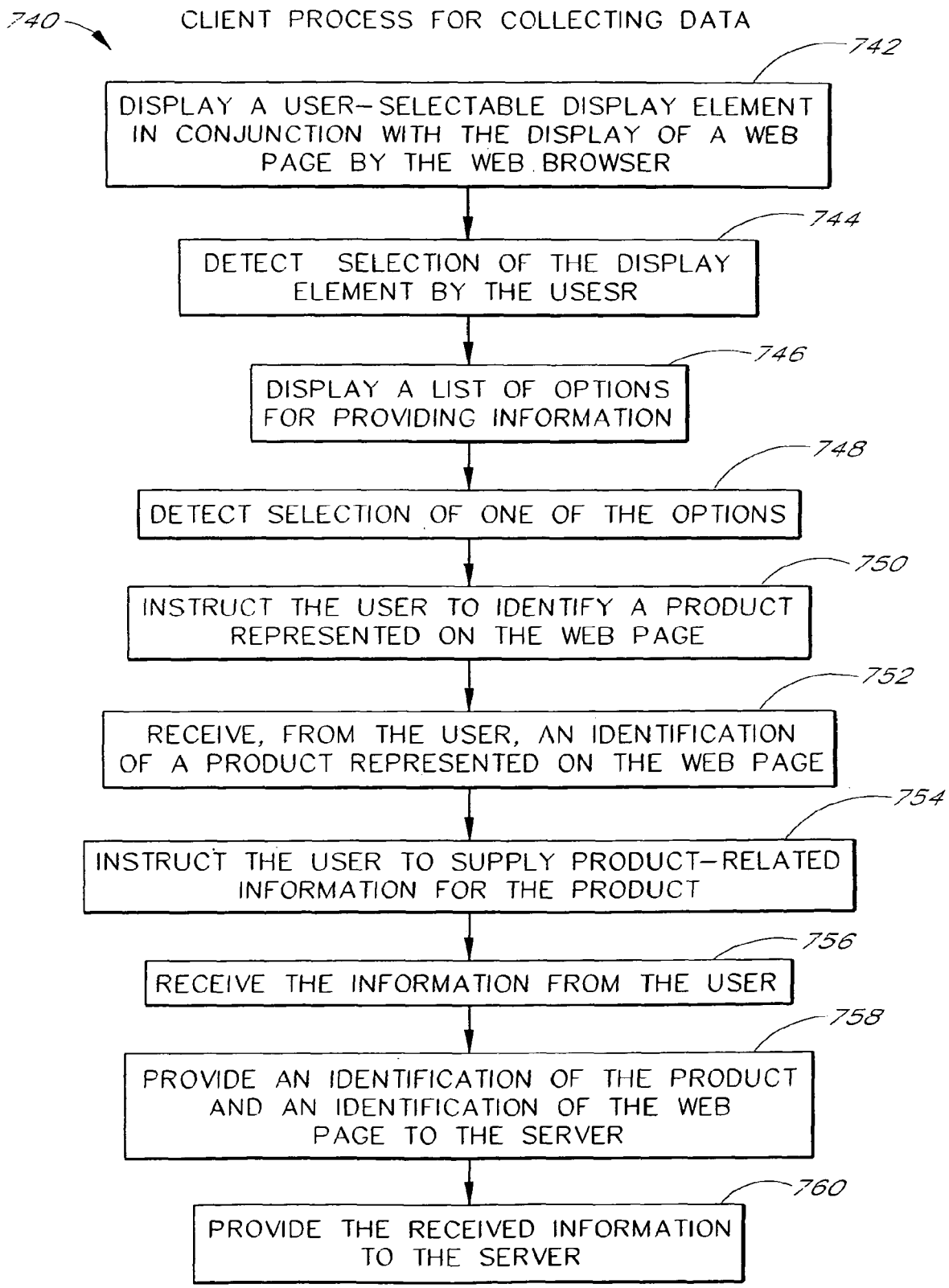
FIG. 7B illustrates a preferred process in accordance with which the client program collects product-related information from a user.

FIG. 7B illustrates a preferred process 740 in accordance with which the client program collects product-related information from a user. At a step 742, the client program displays a user-selectable display element in conjunction with the display of a web page by the web browser. The client program preferably displays the display element in the process described in the steps 702-708 of the process 700. In a first case, the display element may be the write icon 264 of the client program toolbar 260 as illustrated in FIG. 2C. In a second case, the display element may be the retrieve icon 262 of the client program toolbar 260.

At a step 744, the client program detects selection of the display element by the user. At a step 746, the client program responds to the user's selection by displaying a list of options for providing information. In the first case, the list of options may be the list 306 in the menu 304 of FIG. 3B. In this case, the client program preferably executes a portion of the toolbar code 524 that causes the menu to be displayed. In the second case, the list of options may be the list of options 306 included in the bubble 308 of FIG. 3C. In this case, the bubble 308 is preferably displayed as a client bubble web page 532 in a client bubble window 530 that the client program requests from the data server. In a third case, the list of options may be the options 306A-C included in the information bubble 322A as shown in FIG. 3F.

At a step 748, the client program detects selection of one of the options for providing information. In response, the client program formulates an HTTP request for a client bubble web page 532 through which the client program will request the information. The client program transmits the request to the data server and the data server subsequently returns the client bubble web page 532 to the client program.

At a step 750, the client program instructs the user to identify a product represented on the web page. The client preferably performs the step 750 by displaying the client bubble web page 532 in a client bubble window 530. The web page 532 preferably includes a request for the identification of the product.

At a step 752, the client program receives, from the user, an identification of a product represented on the web page displayed by the web browser. In a first case, the identification is received in text form through a text box displayed on the client bubble web page 532. In a second case, the client bubble web page 532 may include Javascript that allows the user to click on a representation of the product on the web page. In a third case, the client bubble web page 532 may include Javascript that allows the client to drag an icon to the location of the representation of the product on the web page.

At a step 754, the client program instructs the user to supply product-related information for the product. The client program preferably performs the step 750 and the step 754 in the same action, by displaying the client bubble web page 532 in the client bubble window 530. The web page 532 preferably includes a request for product-related information. Some of the types of product-related information that can be requested have already been described above in Section II-B.

At a step 756, the client program receives information about the identified product from the user. In a first case, the information is received in text form through a text box displayed on the client bubble web page 532. In a second case, the client bubble web page 532 may also include Javascript that drives the web browser to another web page and displays another bubble web page 532. For example, as illustrated in FIGS. 3J-K, the client program drives the web browser to a search results page. The Javascript may provide tools that allow the user to find additional information about the product. The additional information may be requested and collected in the subsequently displayed bubbles.

At a step 758, the client program provides an identification of the product and an identification of the web page to the data server. The client program preferably identifies the web page in the step 742, which preferably includes the step 702 of the process 700. The web page displayed by the browser is initially identified in the step 702. The client program identifies the product, preferably based upon a product name supplied by the user, in the step 752.

At a step 760, the client program provides the received information to the data server. The client program preferably performs the steps 758 and 760 in a single action. The client program preferably transmits the information as encoded data in conjunction with an HTTP request for an additional client bubble web page 532. The additional client bubble web page is preferably a "Thank You" bubble, such as the bubble 370 illustrated in FIG. 3L.

IV. The Product Data Server

A. Data Server Components

Figure 8:
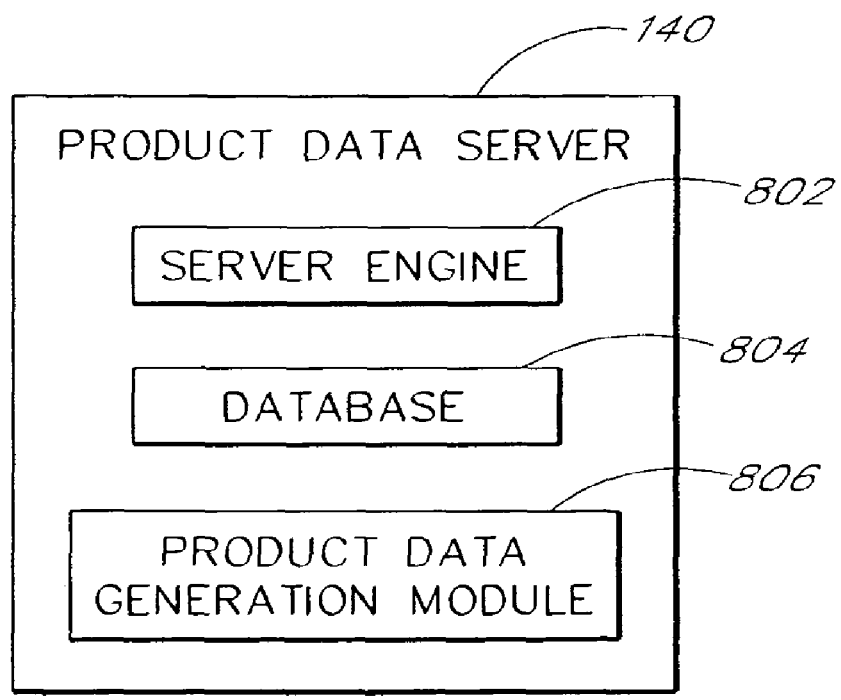
FIG. 8 illustrates a functional block diagram of a preferred embodiment of the data server.

FIG. 8 illustrates a functional block diagram of a preferred embodiment of the data server 140. The data server 140 preferably includes a server engine 802, a database 804, and a product data generation module 806. The data server 140 is preferably implemented as one or more computers connected to the Internet and accessible by multiple instances of the client program 124 running on multiple user computers 120. The product data server is preferably configured to collect and provide product-related data, but may also be configured to collect and/or provide other data or information.

The server engine 802 receives and responds to requests for product-related data from the client programs 124. The requests for data are preferably in the form of HTTP requests for client toolbar web pages 608 or client bubble web pages 532. In response to an HTTP request, the server engine 142 preferably accesses the database 804 to obtain product-related data. The server engine then creates a client toolbar web page 608 or a client bubble web page 532 incorporating the data. The server engine 802 then responds by transmitting the created web pages to the requesting client program 124. Some of the HTTP requests received by the server engine 802 may include user supplied product data. In these cases, the server engine 802 preferably processes the supplied data and populates the database 804 with the acquired data.

The data server 140 preferably uses the URL of each web page upon which a product has been identified as one index to the database 804. Each URL is preferably normalized (canonicalized) such that different URLs referencing the same web page are reduced to the same normalized URL. Each normalized URL is a transformed version of the original URL that is easier to catalog, that resolves domain aliases, and that eliminates appended transient data from the URL. The normalization of each URL can be performed by either the client program 124 or the data server 140. One method for normalizing the URL follows:

1. Normalize the hostname:
   a) Lowercase the hostname
   b) Remove prefixes "www." and "www[number]."
   c) Resolve the hostname if it is an alias
2. Normalize the path:
   a) Remove "/./", "/../", and "//" constructs
   b) Escape non-URL characters (e.g., " " to "%20", "~" to "%7E")
   c) Remove trailing "/" characters The product data generation module 806 is preferably configured to automatically search or crawl the web for product-related data using automatic data mining techniques. The data generation module 806 then populates the database 804 with the accumulated data. Applicable techniques for automatically gathering product-related data are discussed below in Section V.

Product-related data can also be manually collected and entered into the database 804. Individuals can be employed to research and collect product-related data from the web and other sources. Large retailers, such as Amazon.com, already have substantial databases of product information. Manufacturers of products also typically make product information available. This product information may include product descriptions, URLs of web pages upon which the product is offered for sale, as well as other data. This product information can be obtained automatically or manually directly from manufacturers and retailers and made available to users through the present invention.

B. Data Server Methods

Figure 9A:
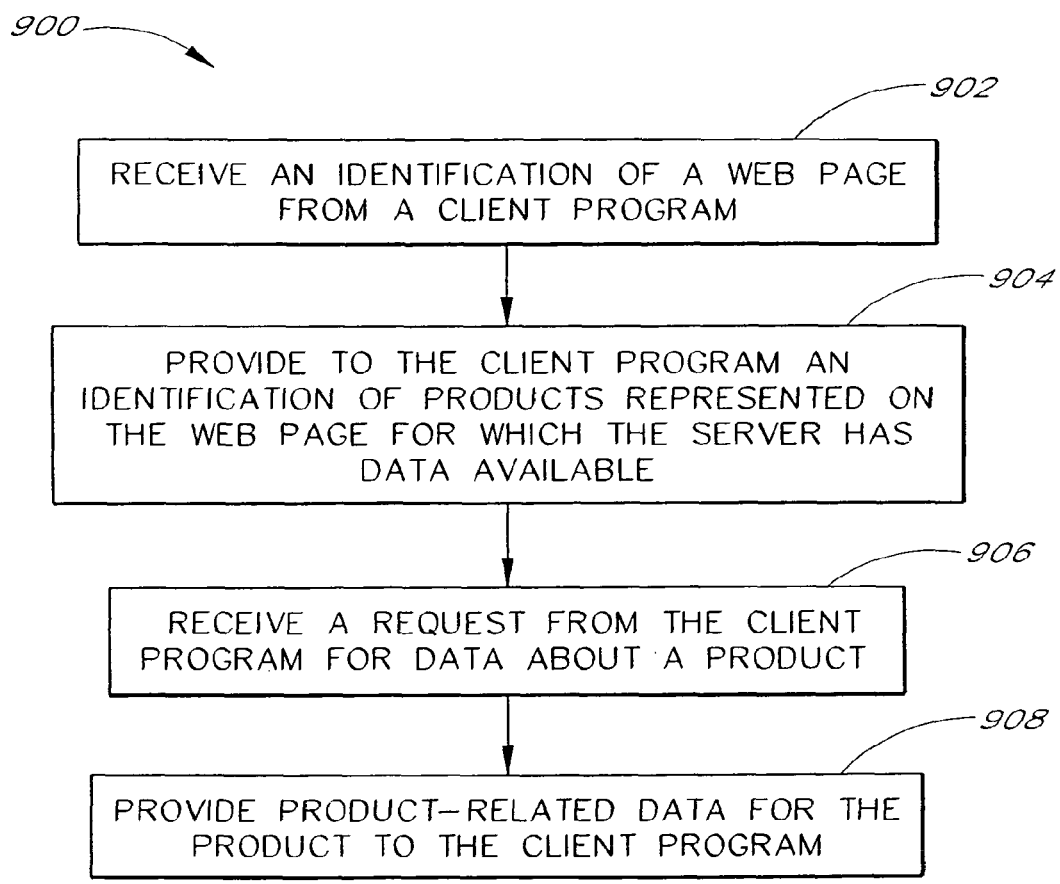
FIG. 9A illustrates a preferred process in accordance with which the data server provides product-related data through the client program.

FIG. 9A illustrates a preferred process 900 in accordance with which the data server 140 provides product-related data through the client program 124. At a first step 902, the data server 140 receives an identification of a product web page from a client program. The term product web page is used solely, without additional implications, to distinguish this web page from other web pages discussed herein. The identification of the product web page is preferably received in the form of an HTTP request for a client toolbar web page 608. The URL of the product web page is preferably encoded and incorporated into the HTTP request.

At a step 904, the server 140 provides to the client program an identification of the products represented on the web page for which the server 140 has data available. In the preferred embodiment, the server engine 802 queries the database 804 to determine whether there is an entry for the identified product web page. If the product web page has an entry in the database 804, the entry preferably associates the product web page with any identified products and their associated product-related data. The server engine 802 preferably incorporates an identification of the products in a client toolbar web page 608 in the form of embedded Javascript. The server engine 802 then preferably serves the client toolbar web page 608 to the client program.

At the step 904, it may be the case that the database 804 contains no entries for the product web page. In one embodiment, no products are identified in this case. In another embodiment, the server 140 dynamically fetches the web page and performs automatic data gathering techniques on the fetched page to identify products. Automatic data gathering techniques are discussed below in Section V.

At a step 906, the server 140 receives a request from the client program for product-related data for a product. The request for data is preferably received in the form of an HTTP request for a client bubble web page 532. The identity of the product is preferably encoded and incorporated into the HTTP request.

At a step 908, the server 140 provides the product-related data to the client program. In the preferred embodiment, the server engine 802 queries the database 804 to retrieve the product-related data for the identified product. The server engine 802 preferably incorporates the product-related data in a client bubble web page 532. The server engine 802 then preferably serves the client bubble web page 532 to the client program.

Figure 9B:
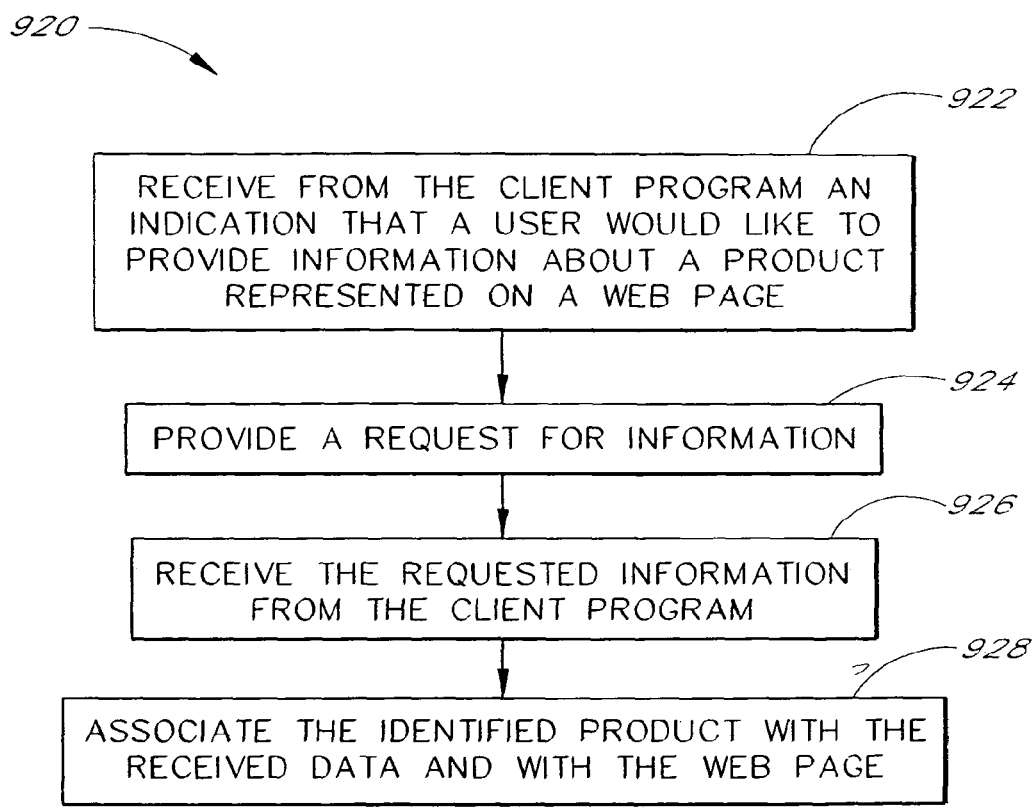
FIG. 9B illustrates a preferred process in accordance with which the data server collects product-related information from users through the client program.

FIG. 9B illustrates a preferred process 920 in accordance with which the data server 140 collects product-related information from users through the client program 124. At a first step 922, the data server 140 receives from a client program an indication that a user would like to provide information about a product represented on a product web page. The indication is preferably received in the form of an HTTP request for a client bubble web page 532 that requests product-related information. The client bubble web page 532 may be, for example, the web page displayed in the bubble 310 of FIG. 3D. The request is preferably generated as a result of a user's selection of a display element. The selected display element may be, for example, any of the options 306A-C of FIG. 3B, 3C, or 3F.

At a step 924, the server 140 provides a request for information. The request is preferably transmitted to the client program in the form of a client bubble web page 532. The client bubble web page 532 preferably includes instructions that direct the user to provide information about a product represented on the product web page. The requested information may include: an identification of the product, such as the original product name as it appears on the product web page; the URL of a web page of an on-line store at which the product may be purchased; the URL of a web page of a related product; and/or any other information. The client bubble web page 532 preferably also includes a form or other mechanism through which the user submits the requested information. In one case, the product may be identified by the user through a form. In another case, the user may have chosen to supply information about a product for which the server already has an entry for the product web page. In this case, the form can be prepopulated with the identity of the product. The client bubble web page 532 may also include Javascript or code that may be executed to assist the user in finding the requested information. One example of the use of Javascript is discussed with reference to the "Get Product Number" button 358 of FIG. 3J, in which the Javascript drives the web browser 122 to a search results page.

At a step 926, the server 140 receives the requested information from the client program. The information is preferably received as data in encoded form in an HTTP request for another client bubble web page 532. The requested client bubble web page 532 may be, for example, the "Thank You" bubble 370 of FIG. 3I. In the preferred embodiment, the server 140 checks to confirm that the supplied original product name is actually present on the product web page. In the case that the original product name is not present on the product web page, the server 140 returns a client bubble web page 532 indicating the discrepancy and possibly requesting that the user re-enter the information.

At a step 928, the server 140 associates the identified product with the received data and also associates the identified product with the product web page. The server engine 802 preferably creates the associations by populating the database 804 with the received information.

V. Automatic Data Gathering Techniques

In the preferred embodiment, the present invention uses the identification of the representation of a product on a web page in order to present information about the product to a user. This data, including the identification of the product representation, can be collected from users themselves, can be manually collected, or can be automatically generated. As described below, the product data generation module 806 can be configured to perform one or more techniques for automatically generating or collecting product-related data.

A. Crawl Time and Run Time Techniques

Crawl time techniques can be used to populate the database 804 with product information in advance of requests for information. In accordance with these techniques, the data generation module 806 preferably fetches web page after web page and analyses each fetched web page to gather or collect product-related data.

Run time techniques are used to gather information on-the-fly as the information is being requested. In one embodiment, the client program 124 sends the URL of a web page to the data server 140. The data generation module 806 then fetches the web page for itself (the same one as is displayed in by web browser) and analyzes the web page. The data generation module 806 then generates, on-the-fly, the data that is returned to the client program 124 to be displayed in conjunction with the web page. In another embodiment, the client program 124 can be configured to send a portion of or the whole web page directly to the data server 140 for analysis. In still another embodiment, the data generation module 806 generates code that is transmitted to and executed by the client program 124 in order to generate product-related information, such as the identification of products on a web page.

B. List Based Tagging and Structural Tagging

List based tagging involves scanning web pages for text matches for known product names. A list of common or popular names for products is preferably generated in advance. Web pages are then scanned for matches to the names in the list.

Structural tagging involves using the structure of a web page or to identify products. For example, one web site may represent products for sale in the same fashion on each web page. Accordingly, the structure of the general web page can be deconstructed and used to create a parsing engine. Each web page of the web site can then be passed through the parsing engine to extract product identifications from the web pages. As another example of structural tagging, properties of product representations can be used to identify representations of products on web pages. For example, product names on web page generally begin with capital letters.

Additional tagging techniques are disclosed in U.S. patent application Ser. No. 09/528,138 filed Mar. 17, 2000 and titled SYSTEM AND METHOD FOR LOCATING WEB-BASED PRODUCT OFFERINGS, which is hereby incorporated by reference.

List based, structural, and other tagging techniques can also be combined. These techniques can be performed as run time techniques, crawl time techniques, or both.

C. Client Side Tagging

Product tagging can also be implemented as a run time technique partially or completely on a client computer 120. Client side tagging can be performed by the client program 124 in addition to or instead of tagging performed by the data generation module 806. In one embodiment, the client program 124 is configured to identify products based upon the structure of a web page (structural tagging) without requesting an identification of products from the data server 140. Alternatively, the client program 124 downloads a product list from the data server 140 and stores the list on the user computer 120. The client program 124 then performs list based tagging techniques upon loaded web pages on the user computer 120. The client program 124 can then request product-related information for identified products from the server 140. In this embodiment, the client program 124 need not first request, from the data server 140, an identification of products represented on a web page before requesting product-related data from the server 140.

D. Information Gathering

Web pages offering products for sale can be automatically identified using techniques described in U.S. patent application Ser. No. 09/528,138 filed Mar. 17, 2000 and referenced above. It will be apparent to one skilled in the art that other automatic information gathering techniques can also be used in conjunction with the present invention.

E. Auction Product Identification

Figure 10:
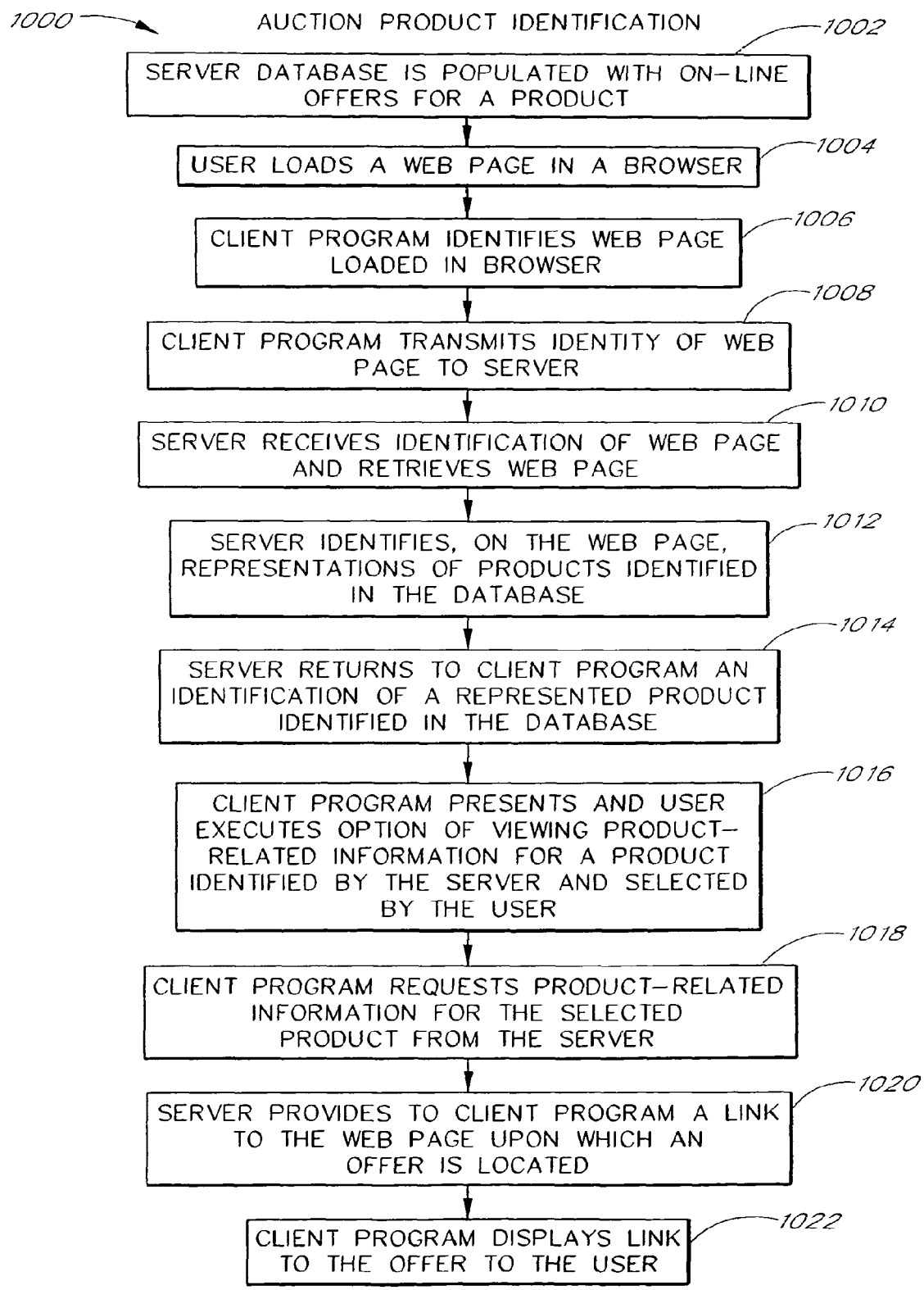
FIG. 10 illustrates a preferred process for dynamically identifying products and for presenting on-line offers for sale or bid for identified products.

FIG. 10 illustrates a preferred process 1000 for dynamically identifying products and for presenting on-line offers for sale or bid for identified products. The process 1000 can be used to identify any product represented on a web page being browsed by a user and to direct the user to a related offer for sale. The process 1000, however, is particularly applicable to bid offers on on-line auctions, which are typically only briefly available, such as for several hours or days.

At a step 1002, the database 804 is populated with on-line offers for sale or bid. The data generation module 806 preferably uses crawl time information gathering techniques to identify offers for sale or bid on-line. Alternatively or additionally, raw data may be obtained directly from on-line retailers or on-line auction service providers if a proper relationship exists. Each offer is preferably identified by the URL of the web page upon which the offer is located. In the case that an offer is an offer to bid in an on-line auction, the offer preferably has an expiry date after which the offer is removed from the database 804. In addition, each offer is preferably associated with a product. The product may be identified by a product ID, such as a UPC code or an ISBN number. Any common or popular names for the product are preferably also associated with the product. The various names can be identified manually or automatically. Different offers for the same product are preferably also associated with each other. The database 806 preferably allows a product to be identified through any of the common or popular names of the product. Identification of the product, in turn, allows identification of the offers for sale or bid for the product.

At a step 1004, the user loads a web page in the web browser 122. At a step 1006, the client program 124 identifies the web page displayed by the web browser 122. At a step 1008, the client program 124 transmits the identity of the web page to the data server 140. The client program 124 preferably transmits the URL of the web page to the data server 140 in conjunction with a hypertext transfer protocol (HTTP) request for a client toolbar web page 608.

At a step 1010, the data server 140 receives the request and retrieves the web page identified by the client program 124 using the supplied URL. At a step 1012, the data generation module 806 scans the text of the web page for representations of products identified in the database 804. The data generation module 806 preferably identifies common or popular names associated with product offer entries in the database 804.

At a step 1014, if a representation of a product listed in the database 804 is identified on the web page, the server engine 802 includes an identification of the product in the client toolbar web page 608 that is then returned to the client program 124.

At a step 1016, the client program 124 presents and the user executes the option of viewing product-related information for the identified product, preferably in accordance with the processes 400 (FIG. 4A) and 700 (FIG. 7A). In one embodiment, the retrieve icon 262 or the web page embedded product element 220 is modified or highlighted to indicate to the user that an auction offer is available for an identified product.

At a step 1018, the client program 124 requests product-related information for the identified product from the data server 140. The request is preferably transmitted in the form of an HTTP request for a client bubble web page 532 and is preferably encoded to incorporate an identification of the product.

At a step 1020, the data server 140 provides a link to the web page upon which an offer for the product is located. The data server 140 preferably returns to the client program 124 a client bubble web page 532 including the link. The data server 140 preferably generates the link by querying the database for the URL of the offer web page based upon the identity of the product. At a step 1022, the client program displays the link to the offer to the user. The link is preferably displayed in the client bubble web page 532.

In an alternative embodiment, at the step 1008, the client program 124 transmits a portion, possibly including the whole, of the text of the web page displayed by the web browser 122 to the data server 140. Accordingly, at the step 1010, the data generation module 806 need not retrieve the web page from a web server.

In still another embodiment, processes 400 (FIG. 4A) and 700 (FIG. 7A) are used in conjunction with the process 900 (FIG. 9A) to dynamically identify bid or sale offers for previously identified products. In accordance with this embodiment, the step 1002 is preferably added to the process 900. Consequently, when the server 140 queries the database 804 in the step 908, the server will be able to identify offers for bid or sale and incorporate links to the offers in the client bubble web page 532.

F. Supplying Product-Related Data Through a Search Engine

In an additional embodiment of the present invention, the client program 124 is configured to submit a search query to a product-oriented search engine in response to selection of a web page embedded product element 220 or a product list element 274. The product-oriented search engine is preferably configured to returns links to web pages that are likely to include relevant product offerings. In accordance with this embodiment, product-related information is supplied by the search engine and need not be supplied by the data server 140. The features of this embodiment may, however, be combined with other embodiments as will be understood by one skilled in the art.

Figure 11:
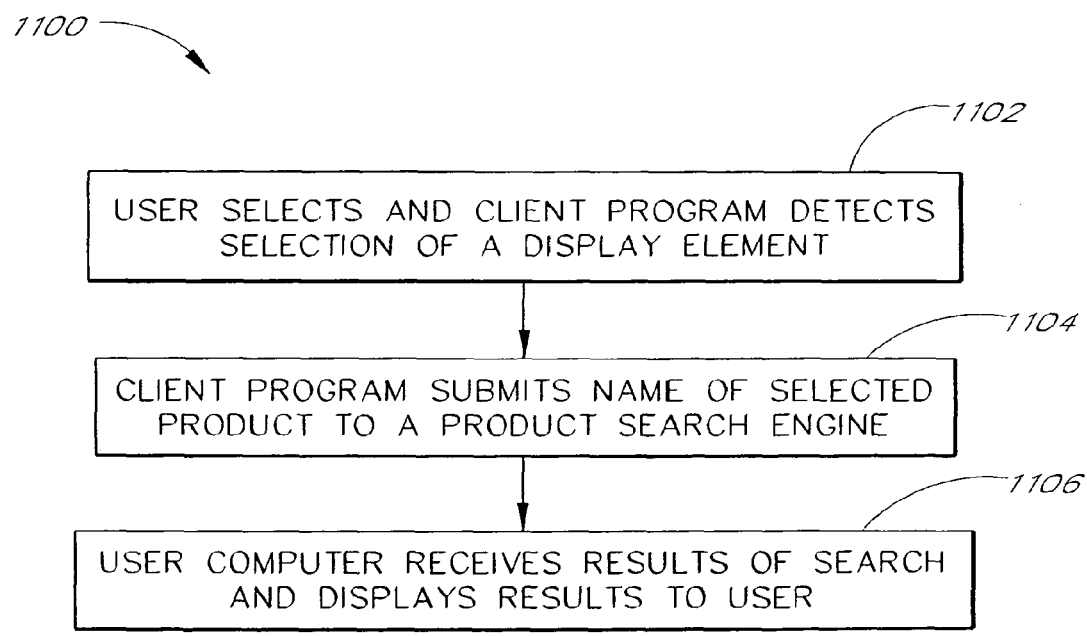
FIG. 11 illustrates a preferred process in accordance with which product-related data is supplied by a search engine.

FIG. 11 illustrates a preferred process 1100 in accordance with which product-related data is supplied by a search engine. The process 1100 preferably follows from the steps 408 of the process 400 (FIG. 4A), 712 of the process 700 (FIG. 7A), and 904 of the process 900 (FIG. 9A). At this point, the client program 124 has displayed user-selectable elements, each of which identify a product represented on the web page.

At a step 1102, the user selects and the client program 124 detects selection of a display element. At a step 1104, the client program preferably submits an identification of the corresponding product as a search query to a product-oriented search engine. The search query is preferably the name of the product or a product identifier such as a product, UPC, or ISBN code/number. The name or product identifier may be obtained by the client program 124, using structural tagging techniques, from a product representation in text form on a web page. The name or product identifier may alternatively be obtained from the data server 140 by having the data server 140 incorporate names of identified products in the client toolbar web page 608.

At a step 1106, the user computer 120 receives the results of the query and displays the results to the user. The client program 124 preferably submits the query in the step 1104 through the main browser window 200 so that the web browser 122 automatically displays the results of the query in the main window 200. Alternatively, the client program 124 submits the query and displays the results in a product information bubble 230 (FIG. 2B).

One applicable search engine is described in U.S. patent application Ser. No. 09/528,138 filed Mar. 17, 2000 and referenced above. In alternative embodiments however, other types of search engines that may not identify product offerings can be used.

VI. Conclusion

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow. In the claims, a portion shall include greater than none and up to the whole of a thing. In the method claims, reference characters are used for convenience of description only, and do not indicate a particular order for performing the method.

What is claimed is:

1. A method for facilitating sharing of information between web users, the method comprising:

monitoring a first user's web browsing activities to detect that a web page accessed by the first user includes a description of a first product, wherein the monitoring is performed using a client program that runs on a first user computer and communicates over a computer network with a data server;

while the first user is accessing the web page on the first user computer, causing the first computer to display a form that prompts the first user to supply at least one specific type of data associated with the first product, wherein the form is separate from the web page, and is presented to the first user under control of the client program running on the first user computer;

in response to submission of the form by the first user, causing data entered by the first user into said form to be stored on the data server; and subsequently, causing the data entered by the first user to be presented to a second user who is accessing said web page on a second user computer, wherein the data is presented to the second user under control of a client program that runs on the second user computer and communicates with the data server.

2. The method of claim 1, wherein monitoring the first user's browsing activities comprises the computer-implemented step of analyzing content of the web page to evaluate whether the web page includes a description of the product.

3. The method of claim 2, wherein the step of analyzing the web page is performed by the first user computer under control of the client program.

4. The method of claim 2, wherein the step of analyzing the web page is performed by the data server.

5. The method of claim 1, further comprising notifying the second user, via a toolbar generated by the client program that runs on the second user computer, that the web page includes a description of a product for which information is available.

6. The method of claim 1, wherein the form includes fields for user entry and submission of a recommendation associated with the first product, and wherein the data entered by the first user and presented to the second user comprises data elements of a recommendation supplied by the first user.

7. The method of claim 6, wherein the recommendation is of an online store for purchasing the first product.

8. The method of claim 6, wherein the recommendation is of a second product that is related to the first product.

9. The method of claim 6, further comprising providing an option to the second user, via the client program that runs on the second user computer, to vote on a quality of the recommendation supplied by the first user.

10. The method of claim 6, wherein the form includes a field for user entry of a web address associated with a recommendation.

11. The method of claim 1, wherein the form includes a field for specifying an identifier of a related product that is related to the first product, and the method comprises presenting to the second user a product identifier entered into said field by the first user.

12. The method of claim 11, wherein the form additionally includes a field for specifying a web address associated with the related product.

13. The method of claim 11, wherein the form additionally includes a field for specifying why the related product is being recommended.

14. The method of claim 11, wherein the form additionally prompts users to specify whether they have an interest in an associated recommendation of a related product.

15. The method of claim 1, wherein the form includes a field for specifying a web address associated with an online store from which the first product can be purchased, and the method comprises causing the second user computer to presenting to the second user a web address entered into said field by the first user.

16. The method of claim 15, wherein the form additionally includes a field that requests information about why the online store is being recommended.

17. The method of claim 15, wherein the form additionally prompts users to specify whether they have an interest in an associated recommendation of an online store.

18. The method of claim 1, further comprising presenting to the first user, under control of the client program running on the first user computer, an option to add the first product to a virtual shopping cart, said option not being provided on the web page.

19. The method of claim 1, wherein the client program that runs on the first user computer is separate from, and runs in conjunction with, a web browser that runs on the first user computer.

20. The method of claim 1, wherein the data server is separate from a web server system that serves the web page.

21. Non-transitory computer storage that stores executable instructions that direct a computing system to perform a process that comprises:
monitoring a first user's web browsing activities to detect that a web page accessed by the first user includes a description of a first product, wherein the monitoring is performed using a client program that runs on a first user computer and communicates over a computer network with a data server;
while the first user is accessing the web page on the first user computer, causing the first computer to display a form that prompts the first user to supply at least one specific type of data associated with the first product, wherein the form is separate from the web page, and is presented to the first user under control of the client program running on the first user computer;
in response to submission of the form by the first user, causing data entered by the first user into said form to be stored on the data server; and
subsequently, causing the data entered by the first user to be presented to a second user who is accessing said web page on a second user computer, wherein the data is presented to the second user under control of a client program that runs on the second user computer and communicates with the data server.

22. The non-transitory computer storage of claim 21, wherein monitoring the first user's web browsing activities comprises analyzing content of the web page to evaluate whether the web page includes a description of the product.

23. The non-transitory computer storage of claim 21, wherein the form includes fields for user entry and submission of a recommendation associated with the first product, and wherein the data entered by the first user and presented to the second user comprises data elements of a recommendation supplied by the first user.

24. Non-transitory computer storage that stores a computer program that provides functionality for users to share information about products represented on web pages, said computer program comprising executable instructions that direct a computing system to perform a process that comprises:
monitoring web browsing activities of a first user of a first user computing device;
detecting that a web page accessed by the first user on the first user computing device includes a description of a first product, said detecting comprising communicating over a computer network with a data server;
while the first user is accessing the web page on the first user computing device, causing the first user computing device to display a form that prompts the first user to supply at least one specific type of data associated with the first product, wherein the form is separate from the web page, and is presented to the first user under control of said computer program;
sending data entered into the form by the first user to said data server for storage thereon;
retrieving, from the data server, information submitted by a second user regarding the first product, said information submitted by the second user from a second user computing device; and
causing the first user computing device to display said information in conjunction with the web page.

25. The non-transitory computer storage of claim 24, wherein monitoring the first user's web browsing activities comprises analyzing content of the web page and, based on said content, determining that the web page includes a description of the first product.

26. The non-transitory computer storage of claim 24, wherein the form includes fields for user entry and submission of a recommendation associated with the first product.

27. The method of claim 24, wherein the form includes a field for specifying an identifier of a related product that is related to the first product.

28. The non-transitory computer storage of claim 24, wherein the computer program runs on the first user computing device.

29. The non-transitory computer storage of claim 24, wherein the computer program is a browser toolbar program runs on the first user computing device in conjunction with a browser.

* * * * *

UNITED STATES PATENT AND TRADEMARK OFFICE
CERTIFICATE OF CORRECTION

| | | |
|---|---|---|
| PATENT NO. | : 8,145,542 B2 | Page 1 of 1 |
| APPLICATION NO. | : 12/048044 | |
| DATED | : March 27, 2012 | |
| INVENTOR(S) | : Brewster P. Kahle et al. | |

It is certified that error appears in the above-identified patent and that said Letters Patent is hereby corrected as shown below:

On the Title page, in the Inventors section (75), change "Merve" to --Merwe--.

On the Title page, in the "Related U.S. Application Data" section (62), after "7,373,313" insert --, which claims the benefit of U.S. Provisional Application No. 60/199,569, filed on April 25, 2000--.

Signed and Sealed this

Fourth Day of September, 2012

David J. Kappos
*Director of the United States Patent and Trademark Office*